(12) United States Patent
Sasaki

(10) Patent No.: US 9,207,885 B2
(45) Date of Patent: Dec. 8, 2015

(54) IMAGE FORMING SYSTEM HAVING REMOTELY ACCESSED SHARED IMAGE FORMING APPARATUS

(71) Applicant: Makoto Sasaki, Tokyo (JP)

(72) Inventor: Makoto Sasaki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/517,978

(22) Filed: Oct. 20, 2014

(65) Prior Publication Data

US 2015/0109638 A1 Apr. 23, 2015

(30) Foreign Application Priority Data

Oct. 21, 2013 (JP) .................. 2013-218105
Oct. 10, 2014 (JP) .................. 2014-208564

(51) Int. Cl.
 *G06F 3/12* (2006.01)
 *H04N 1/32* (2006.01)
 *H04N 1/00* (2006.01)

(52) U.S. Cl.
 CPC ............ *G06F 3/1205* (2013.01); *G06F 3/1204* (2013.01); *G06F 3/1224* (2013.01); *G06F 3/1257* (2013.01); *G06F 3/1292* (2013.01); *H04N 1/0097* (2013.01); *H04N 1/00204* (2013.01); *H04N 1/00954* (2013.01); *H04N 1/32518* (2013.01); *H04N 2201/0075* (2013.01); *H04N 2201/0094* (2013.01)

(58) Field of Classification Search
 None
 See application file for complete search history.

(56) References Cited

U.S. PATENT DOCUMENTS

2009/0052348 A1* 2/2009 Kato et al. ................. 370/254
2010/0069008 A1* 3/2010 Oshima et al. .............. 455/41.3

FOREIGN PATENT DOCUMENTS

JP   2006-338636   12/2006
JP   2010-003128   1/2010

* cited by examiner

*Primary Examiner* — Thomas D Lee
(74) *Attorney, Agent, or Firm* — Harness, Dickey & Pierce, P.L.C.

(57) ABSTRACT

An image forming system includes mobile terminals and image forming apparatuses, in which one image forming apparatus receives setting information to be used in order to use the image forming apparatus, the setting information being stored in one mobile terminal and able to be transmitted to another mobile terminal that will use another image forming apparatus based on the setting information. The one image forming apparatus determines whether the setting information is to be changed based on a comparison between the ability of the image forming apparatuses and, when determining that the setting information is to be changed, changes the setting information and send the changed setting information to the other mobile terminal.

6 Claims, 28 Drawing Sheets

FIG.5

| SETTING FILE C | |
|---|---|
| COLOR/ MONOCHROME | COLOR |
| TRAYS FOR SORTING | 1,2,3… |
| ONE-SIDED/ DOUBLE-SIDED | ONE-SIDED |
| STAPLE | YES |
| PUNCH | NO |

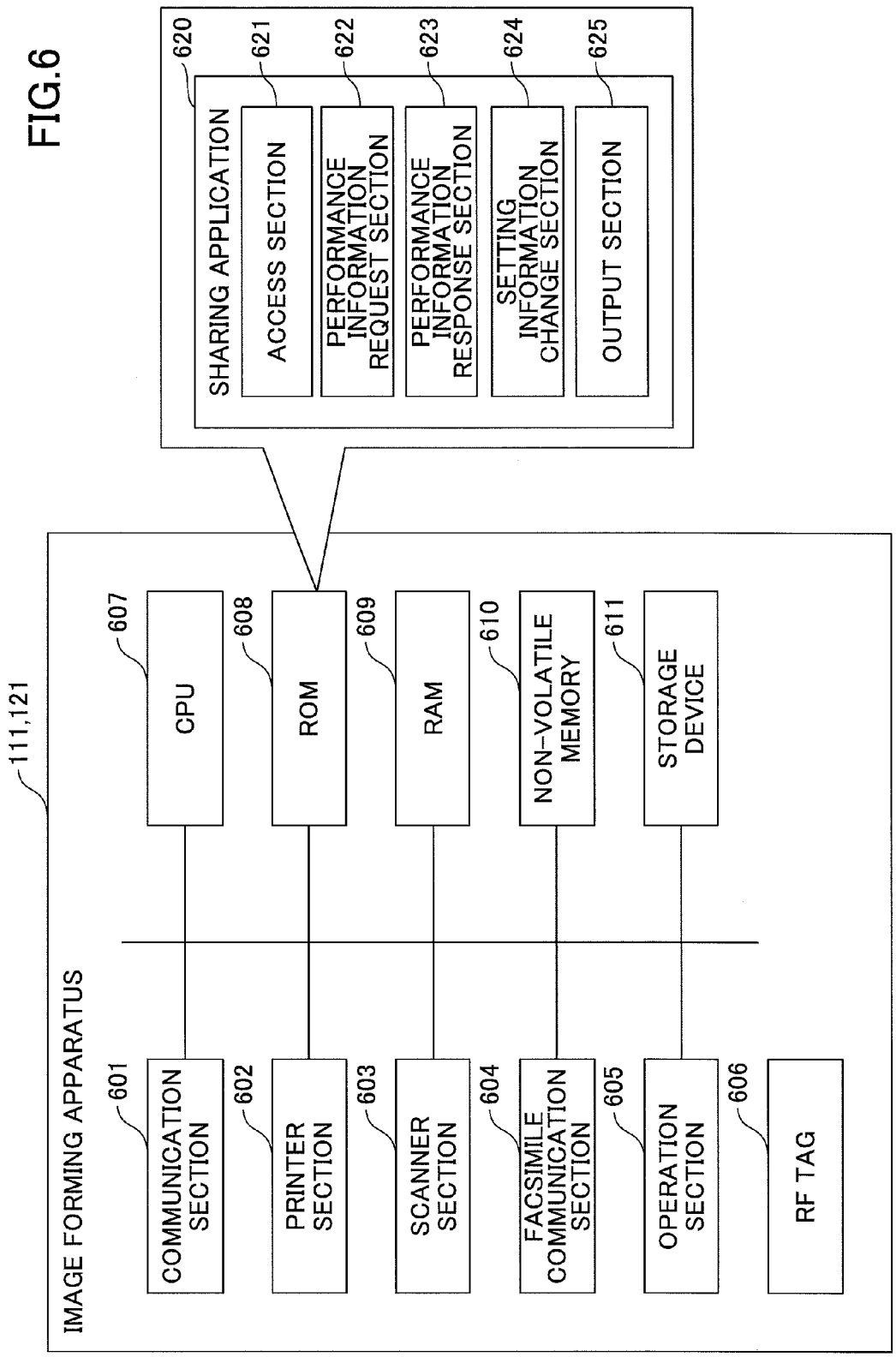

FIG.10A

| APPLICATION DESTINATION | SETTING INFORMATION |
|---|---|
| IMAGE FORMING APPARATUS A | SETTING FILE A |
| IMAGE FORMING APPARATUS B | SETTING FILE B |
| | |

FIG.10B

| APPLICATION DESTINATION | SETTING INFORMATION |
|---|---|
| IMAGE FORMING APPARATUS A | SETTING FILE A |
| IMAGE FORMING APPARATUS B | SETTING FILE B |
| IMAGE FORMING APPARATUS D | |

FIG.10C

| APPLICATION DESTINATION | SETTING INFORMATION |
|---|---|
| IMAGE FORMING APPARATUS A | SETTING FILE A |
| IMAGE FORMING APPARATUS B | SETTING FILE B |
| IMAGE FORMING APPARATUS D | SETTING FILE C' |

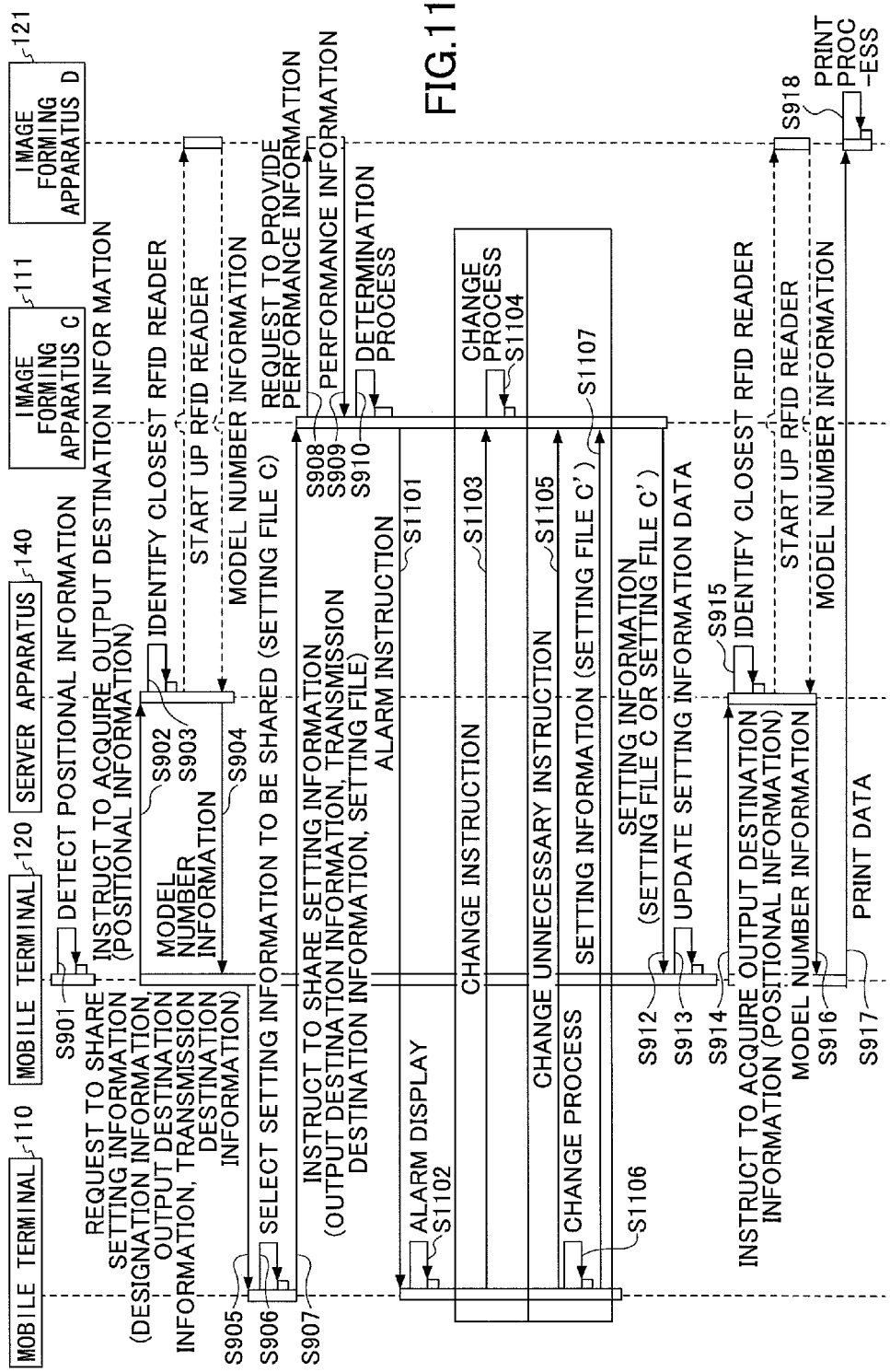

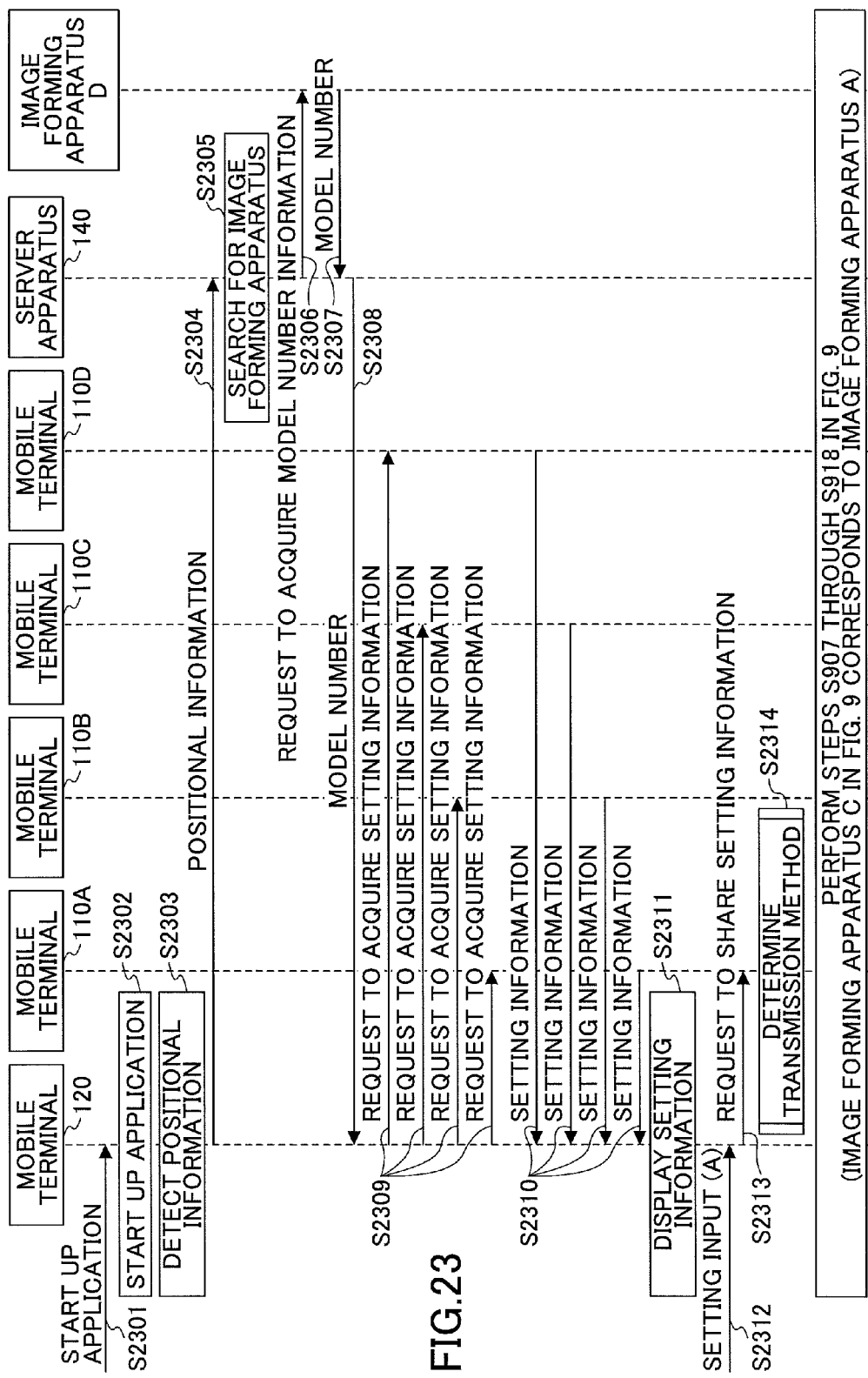

FIG.24D

SELECT SETTING METHOD

SET BASED ON HISTORY

SEARCG FOR SETTING

SET BY INPUT

FIG.24E

| SETTING ORDER / SETTING NAME | USER ORDER / USER | APPARATUS ORDER / APPARATUS NAME |
|---|---|---|
| GAZETTE PRITING | A | A |
| DOCUMENT PRINTING | A | A |
| LOW-COST PRINTING | B | B |
| INTERNAL REPORT | C | C |
| EXTERNAL PRESENTATION | D | D |

FIG.24F

OK TO USE THIS SETTING ?

| SETTING NAME | USER | APPARATUS NAME |
|---|---|---|
| GAZETTE PRITING | A | A |

OK    CANCEL

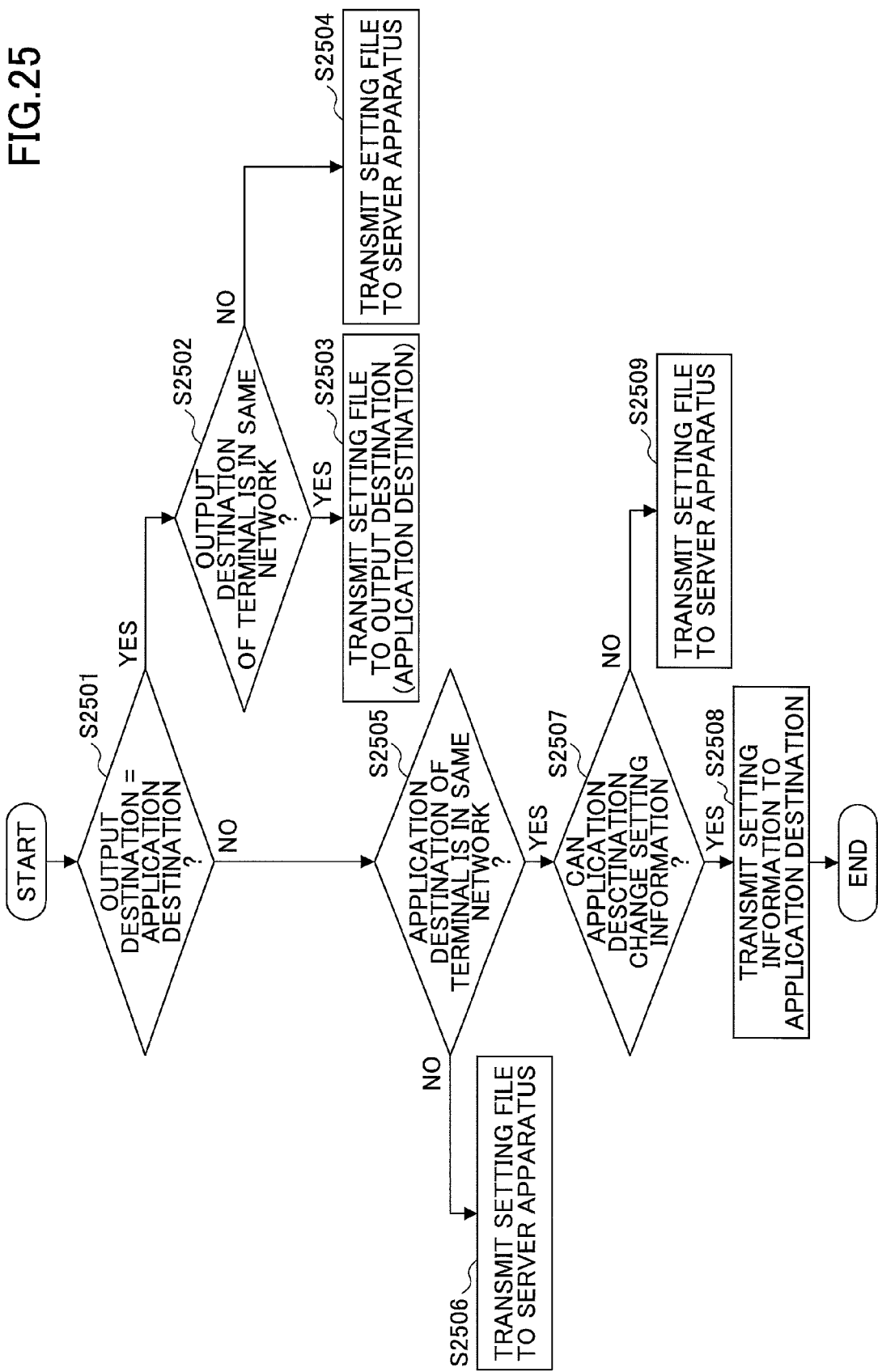

FIG.26

| IMAGE FORMING APPARATUS NAME | ABILITY OF CHANGING SETTING INFORMATION |
|---|---|
| IMAGE FORMING APPARATUS A | YES |
| IMAGE FORMING APPARATUS B | NO |
| IMAGE FORMING APPARATUS C | YES |

IMAGE FORMING SYSTEM HAVING REMOTELY ACCESSED SHARED IMAGE FORMING APPARATUS

CROSS-REFERENCE TO RELATED APPLICATIONS

The present application is based on and claims the benefit of priority under 35 U.S.C §119 of Japanese Patent Application Nos. 2013-218105 filed Oct. 21, 2013, and 2014-208564 filed Oct. 10, 2014, the entire contents of which are hereby incorporated herein by reference.

BACKGROUND OF THE INVENTION

1. Field of the Invention

The present invention generally relates to an image forming system.

2. Description of the Related Art

There has been known an image forming system that includes one or more mobile terminals and one or more image forming apparatuses. According to such an image forming system, it becomes possible to remotely control the image forming apparatus by the mobile terminal and it becomes possible to automatically select one image forming apparatus as the output destination of a mobile terminal among plural image forming apparatuses in accordance with the positional information of the mobile terminal.

Further, there has been proposed a configuration in which plural mobile terminals are combined (grouped) so that the information related to the image forming apparatus (e.g., access right information) can be shared among the plural mobile terminals (see, for example, Japanese Laid-open Patent Publication NO. 2010-003128). According to this document, by giving access right to an operator who is located near an image forming apparatus installed in a separated position so that the operator can temporarily access the document in the image forming apparatus, it becomes possible to remotely receive the document.

By doing this, by combining the plural mobile terminals, it becomes possible to share information about the image forming apparatus (e.g., the access right information) among the plural mobile terminals.

SUMMARY OF THE INVENTION

According to an aspect of the present invention, an image forming system includes first and second mobile terminals; and first and second image forming apparatuses.

Further the first mobile terminal includes
a storing unit storing setting information to be used to cause the first image forming apparatus to perform a process,
a receiving unit receiving identification information identifying the second image forming apparatus and a request to acquire the setting information stored in the storing unit from the second mobile terminal, and
a first transmission unit transmitting the identification information identifying the second image forming apparatus received by the receiving unit and the setting information stored in the storing unit to the first image forming apparatus.

Further, the first image forming apparatus includes
an acquisition unit acquiring ability information indicating ability of the second image forming apparatus identified based on the identification information transmitted from the first mobile terminal,
a first determination unit determining whether the setting information, which is to be transmitted from the first mobile terminal, is to be changed based on a comparison between the ability information indicating the ability of the second image forming apparatus acquired by the acquisition unit and ability of the first image forming apparatus,
a change unit changing, when the first determination unit determines that the setting information is to be changed, the setting information based on the ability information indicating the ability of the second image forming apparatus, and
a second transmission unit transmitting the setting information that has been changed by the change unit to the second mobile terminal.

BRIEF DESCRIPTION OF THE DRAWINGS

Other objects, features, and advantages of the present invention will become more apparent from the following description when read in conjunction with the accompanying drawings, in which:

FIG. 5 illustrates an example of a setting file of the image forming apparatus;

FIG. 6 illustrates a hardware configuration of the image forming apparatus;

FIGS. 10A through 10C illustrate transitions of setting information data in the sharing process of the setting information;

FIG. 11 is another sequence diagram illustrating a flow of the sharing process of the setting information in the image forming system;

FIG. 23 is still another sequence diagram illustrating a flow of the sharing process of the setting information in the image forming system;

FIGS. 24A through 24F illustrate display screens of the mobile terminal;

FIG. 25 is a flowchart of a transmission destination determination process of the setting file;

FIG. 26 is a drawing illustrating whether the setting information can be changed in the image forming apparatuses.

DETAILED DESCRIPTION OF THE PREFERRED EMBODIMENTS

Figure 1:
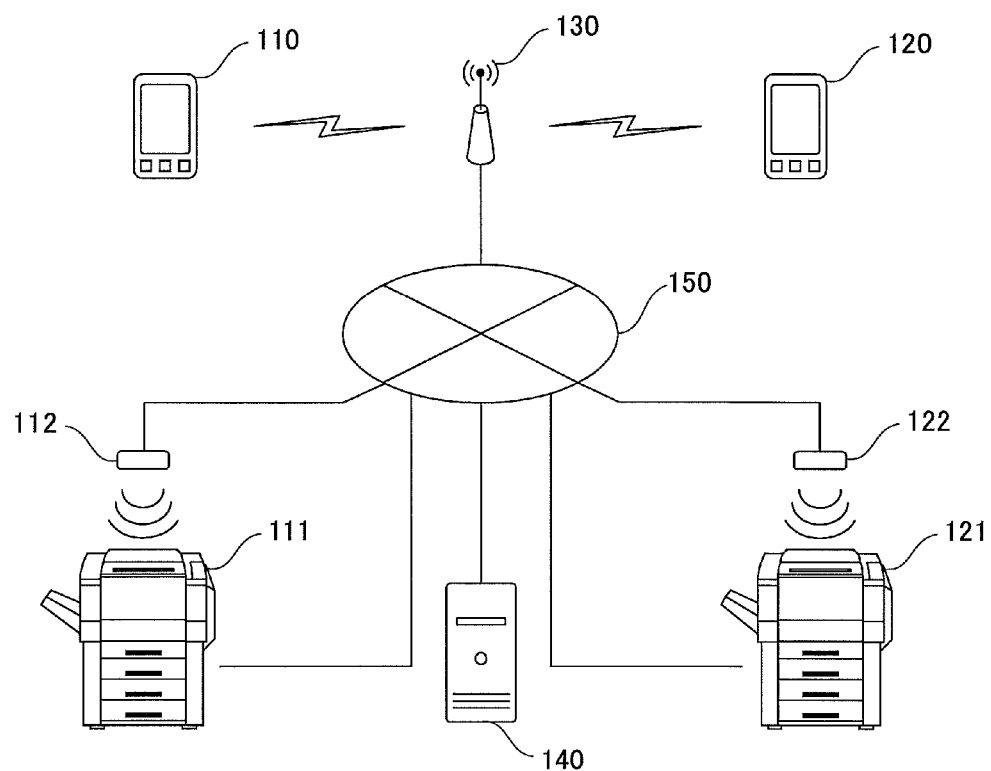
FIG. 1 illustrates an example of an entire configuration of an image forming system according to an embodiment.

In related technologies, there is an image forming system including plural image forming apparatuses and plural mobile terminals. In such an image forming system, it is possible to share information about the image forming apparatuses (e.g., the access right information) among the mobile terminals. Besides the access right information, as the information about the image forming apparatuses that can be shared among the plural mobile terminals, there is, for example, setting information. When the setting information can be shared among the mobile terminals, it becomes possible to reduce a workload of setting operations on the mobile terminals, thereby enhancing the convenience of using the mobile terminals for the users when, for example, a document is printed out by operations using the mobile terminals.

However, it is not always true that the setting information applicable to a specific image forming apparatus can also be applicable to another image forming apparatus. This is because in the image forming system, the functions of one image forming apparatus may be different from those of another image forming apparatus. Due to such a differences, even when the setting information is shared among the mobile terminals, if the setting information includes a setting item that cannot be applied to one image forming apparatus, a user of the image forming apparatus may have to manually perform the setting operation, which is not convenient for the user.

The present invention is made in light of the problem, and may provide an image forming system in which the setting operations using the mobile terminals become more convenient.

In the following, embodiments of the present invention are described with reference to the accompanying drawings. In the description and the figures, the same reference numerals may be used to describe substantially the same elements and the repeated description thereof may be omitted.

First Embodiment

1. Overall Configuration of an Image Forming System

First, an overall configuration of an image forming system according to this embodiment is described. FIG. 1 illustrates an overall configuration of an image forming system 100 according to this embodiment.

As illustrated in FIG. 1, the image forming system 100 according to this embodiment includes plural mobile terminals (mobile terminals 110 and 120) and plural image forming apparatuses (image forming apparatuses 111 and 121). The image forming system 100 further includes plural Radio Frequency Identification (RFID) readers 112 and 122, an access point 130, and a server apparatus 140.

The image forming apparatuses 111 and 121, the RFID readers 112 and 122, the access point 130, and the server apparatus 140 are connected via a network 150. Further, the mobile terminals 110 and 120 are wirelessly connected to the network 150 via the access point 130. By doing this, it becomes possible for the mobile terminals 110 and 120, the image forming apparatuses 111 and 121, the RFID readers 112 and 122, and the server apparatus 140 to mutually transmit and receive information.

The mobile terminal 110 has the setting information to be used to print out a document by using the image forming apparatus 111 and a document by using the image forming apparatus 121. Further, the mobile terminal 110 includes a positional information detection section such as a Global Positioning System (GPS) so that the mobile terminal 110 can recognize the position of the mobile terminal 110.

The mobile terminal 120 is located near the image forming apparatus 121. Here, it is assumed that the mobile terminal 120 does not have the setting information to be used to print out a document by using the image forming apparatus 121, and the mobile terminal 120 will acquire the setting information by performing a sharing process of the setting information described below.

Further, it is assumed that when the mobile terminal 120 causes an image forming apparatus to print out a document by using the acquired setting information, the image forming apparatus 121, which is closest to the mobile terminal 120, is automatically selected as the output destination. Further, similar to the mobile terminal 110, the mobile terminal 120 includes the positional information detection section such as the Global Positioning System (GPS) so that the mobile terminal 120 can recognize the position of the mobile terminal 120.

The access point 130 is an apparatus to provide wireless communication with the mobile terminal 110 and the mobile terminal 120. To that end, the access point 130 transmit the information which is transmitted from the mobile terminal 110 and the mobile terminal 120, and transmits the information, which is received via the network 150, to the mobile terminal 110 or the mobile terminal 120.

The image forming apparatus 111 and the image forming apparatus 121 are apparatuses including a scanner function, a print function, a facsimile function, etc. The apparatuses include a multifunction peripheral (MFP). It is assumed that the print function of the image forming apparatus 111 and the image forming apparatus 121 is provided in a manner such that various items (or a part of the various items) can be set, the various items including a color/monochrome setting, a sort setting of trays, a setting of one-sided printing/double-sided printing, a staple setting, a punch setting, etc. Further, in this embodiment, it is assumed that there is a difference in settable items between the image forming apparatus 111 and the image forming apparatus 121.

The RFID readers 112 and 122 are apparatuses to read the information stored in the respective RFID tags which are provided in the image forming apparatus 111 and the image forming apparatus 121 by transmitting and receiving radio waves or electromagnetic waves. The RFID tags store the information of, for example, the model numbers of the respective image forming apparatuses, so that the RFID readers 112 and 122 can read the information based on an instruction from the server apparatus 140 and transmit the information to the server apparatus 140.

Further, it is assumed that the RFID readers 112 and 122 are installed on a ceiling of the office where the image forming apparatuses are installed, in a manner such that the RFID readers 112 and 122 are separated from each other by a predetermined distance. Further, it is also assumed that the RFID reader 112 is installed near the image forming apparatus 111, and the RFID reader 122 is installed near the image forming apparatus 121.

Figure 2:
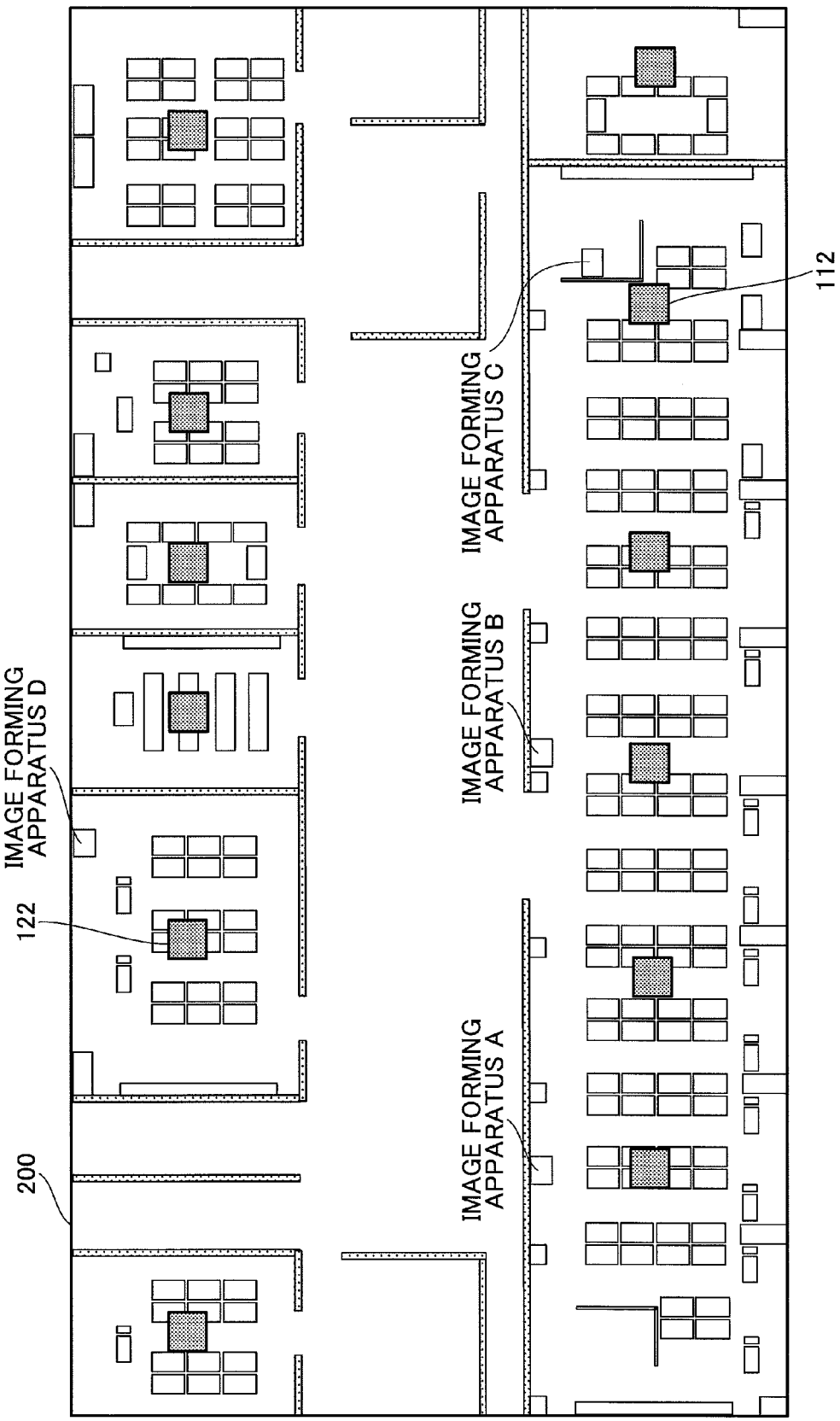
FIG. 2 illustrates an example layout of image forming apparatuses and RFID readers included in the image forming system.

FIG. 2 illustrates an example layout data in the office. More specifically, FIG. 2 illustrates an example layout of the image forming apparatuses and the RFID readers. In the example layout data 200 of FIG. 2, there are four image forming apparatuses A through D disposed on the same floor. Among those image forming apparatuses, the image forming apparatus C corresponds to the image forming apparatus 111 of FIG. 1. Also, the image forming apparatus D corresponds to the image forming apparatus 121 of FIG. 1.

Further, in the example layout data 200 of FIG. 2, there are twelve RFID readers disposed on the same floor. Among those RFID readers, the RFID reader disposed near the image forming apparatus C corresponds to the RFID reader 112 of FIG. 1. Also, the RFID reader disposed near the image forming apparatus D corresponds to the RFID reader 122 of FIG. 1.

Referring back to FIG. 1, the server apparatus 140 communicates with the RFID readers 112 and 122, so that the server apparatus 140 acquires the information indicating the image forming apparatuses 111 and 121 (e.g., model number information), the information having been read by the RFID readers 112 and 122. In this embodiment, the server apparatus 140 acquires the information indicating the image forming apparatus 121 in response to an instruction from the mobile terminal 120. Then, the server apparatus 140 transmits the acquired information to the mobile terminal 120.

2. Procedure of Sharing Process of Setting Information and Transmission Paths of Various Information in the Image Forming System Next, a procedure of a sharing process of the setting information and transmission paths of various information in the image forming system 100 are described. In the image forming system 100 according to this embodiment having the overall configuration of FIG. 1, the "sharing process of the setting information" is executed in which the setting information stored in the mobile terminal 110 is provided to the mobile terminal 120 in response to a request from the mobile terminal 120.

Figure 3:
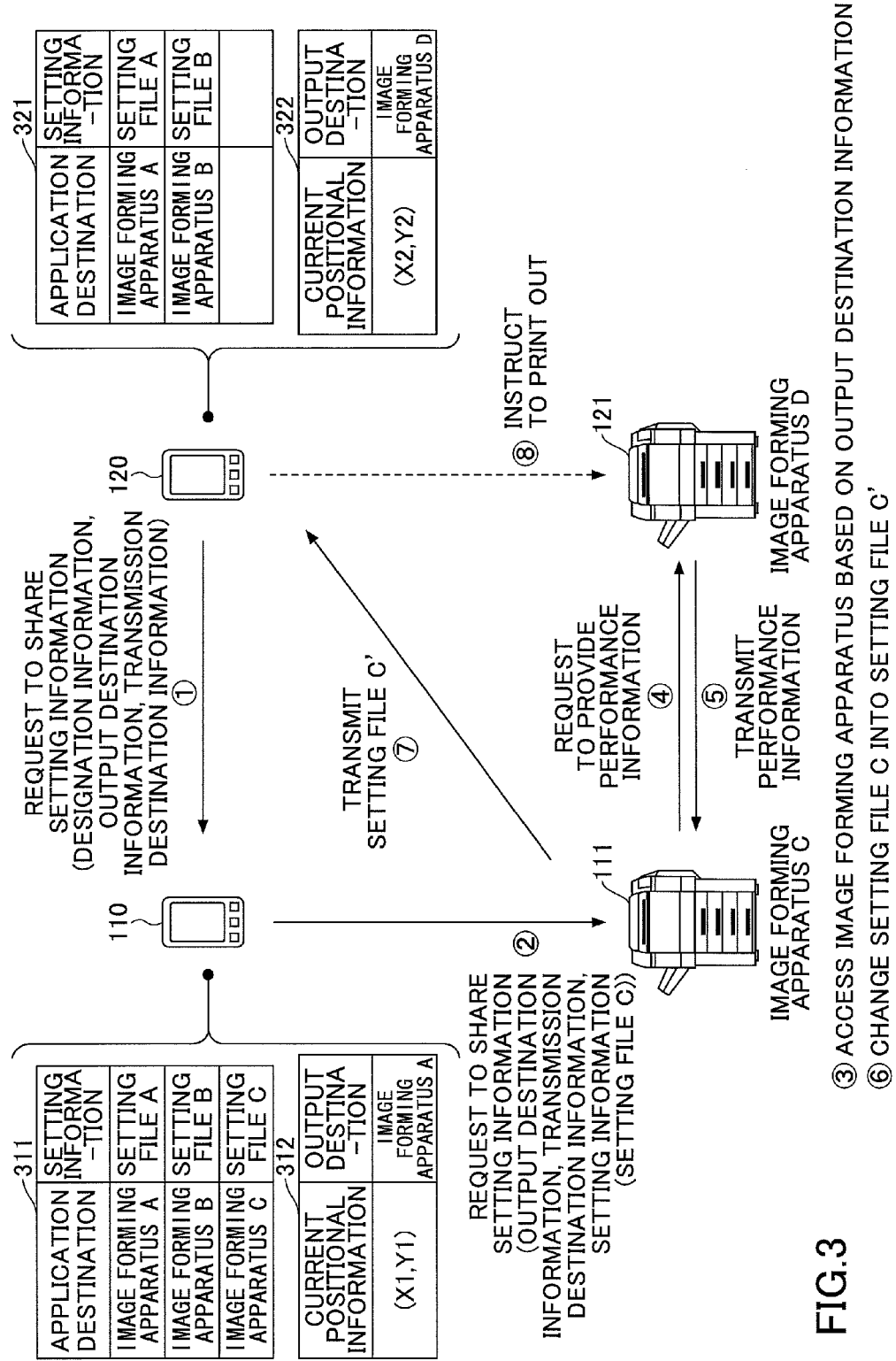
FIG. 3 schematically illustrates a procedure of a sharing process of setting information and transmission paths of various information in the image forming system.

Accordingly, in the following, a procedure and the transmission paths of the various information, when the sharing process of the above setting information is executed, are described. FIG. 3 schematically illustrates a procedure of the sharing process of the setting information and the transmission paths of the various information in the image forming system 100.

The example of FIG. 3 illustrates a case where the mobile terminal 120 sends a request to the mobile terminal 110 to share setting information to be used to print out document data by using the image forming apparatus 121 ("image forming apparatus D") which is the closest to the mobile terminal 120 because the mobile terminal 120 does not have the setting information.

However, the mobile terminal 110 does not have the setting information to be used to print out document data by using the image forming apparatus 121 ("image forming apparatus D"), either. Due to this, it is assumed that a user of the mobile terminal 120 designates the image forming apparatus C, which is similar to the image forming apparatus D, and sends a request to share (necessary) setting information.

As illustrated in FIG. 3, the mobile terminal 120 includes setting information data 321 and output destination information data 322. The setting information data 321 stores the setting information, which is used to print out a document by using an image forming apparatus, in association with the image forming apparatus to which the setting information is applied as application destination of the setting information. In the example of FIG. 3, the mobile terminal 120 includes a "setting file A" as the setting information to be used to print out a document by using the image forming apparatus A. The mobile terminal 120 further includes a "setting file B" as the setting information to be used to print out a document by using the image forming apparatus B.

On the other hand, the output destination information data 322 stores positional information of the current position of the mobile terminal 120 in association with the image forming apparatus installed at the position closest to the mobile terminal 120 and identified based on the positional information. As described above, the mobile terminal 120 includes the positional information detection section, so that the mobile terminal 120 can recognize (detect) the current position of the mobile terminal 120. Further, when the mobile terminal 120 prints out a document, the mobile terminal 120 can automatically select the image forming apparatus which is closest to the mobile terminal 120 as the output destination. To that end, the mobile terminal 120 always manages the output destination upon the print out as the output destination information data 322. The example of FIG. 3 illustrates a case where the "image forming apparatus D" is automatically selected as the output destination in accordance with the current positional information.

Similar to the mobile terminal 120, the mobile terminal 110 also includes setting information data 311 and output destination information data 312. However, those data are similar to the data of the mobile terminal 120. Therefore, detailed descriptions thereof are herein omitted.

Under such configurations, a sharing request to share the setting information to be transmitted from the mobile terminal 120 to the mobile terminal 110 includes the following information items.

Information indicating the designated image forming apparatus: that is, the information indicating the image forming apparatus that is designated by a user of the mobile terminal 120 (hereinafter "designated information"). In the example of FIG. 3, the image forming apparatus C is designated as the designated information.

Information indicating the current output destination of the mobile terminal 120: that is, the information indicating the current output destination stored in the output destination information data 322 (hereinafter "output destination information"). In the example of FIG. 3, the image forming apparatus D is managed as the output destination information.

Information related to the transmission destination of the setting information that is to be shared: that is, the destination information when the setting information is transmitted to the mobile terminal that is the request source to send the request to share the setting information (hereinafter "transmission destination information"). In the example of FIG. 3, the destination information of the mobile terminal 120 corresponds to the transmission destination information.

The mobile terminal 110, which has received the request to share the setting information, selects the setting information to be shared. Specifically, the mobile terminal 110 selects the setting information to be shared based on the designated information which is included in the request to share the setting information. In the example of FIG. 3, the "setting file C" is selected, which is the setting information stored in association with the image forming apparatus C.

The mobile terminal 110 that has selected the setting information to be shared sends an instruction to share the setting information. This instruction to share the setting information is transmitted to the image forming apparatus corresponding to the selected setting information. In the example of FIG. 3, the instruction to share the setting information is transmitted to the image forming apparatus 111 ("image forming apparatus C")

Here, the instruction to share the setting information includes the following information items.

The output destination information
The transmission destination information
The setting information Among those information items, the output destination information and the transmission destination information are included in the request to share the setting information and correspond to the "image forming apparatus D" and the "destination information" of the mobile terminal 120 in the example of FIG. 3. Further, the setting information refers to the setting information selected in the mobile terminal 110 and corresponds to the "setting file C" in the example of FIG. 3.

The image forming apparatus 111 that has received the request to share the setting information from the mobile terminal 120 (i.e., the "image forming apparatus C") accesses the image forming apparatus that is identified by the "output destination information" included in the instruction to share the setting information to ask to provide performance information.

The performance information refers to, for example, the information related to the color/monochrome setting, the sort setting of trays, the setting of one-sided printing/double-sided printing, the staple setting, the punch setting, etc., in the print function. Namely, the performance information refers to the information related to the items that are settable by a user in print output.

The image forming apparatus 121 ("image forming apparatus D") that is requested to provide the performance information transmits the performance information thereof to the image forming apparatus 111 ("image forming apparatus C"). On the other hand, the image forming apparatus 111 ("image forming apparatus C") that has received the performance information from the image forming apparatus 121 ("image forming apparatus D") reads the performance information thereof. Then, the image forming apparatus 111 ("image forming apparatus C") compares the performance information of the image forming apparatus 111 ("image forming apparatus C") with the performance information of the image forming apparatus 121 ("image forming apparatus D").

As a result of the comparison, when determining that there is no difference between the performance information of the image forming apparatus 111 and the performance information of the image forming apparatus 121, the image forming apparatus 111 determines that the setting information included in the instruction to share the setting information can be directly applicable to the image forming apparatus 121 ("image forming apparatus D"). Accordingly, based on the transmission destination information that is included in the instruction to share the setting information (i.e., the destination information of the mobile terminal 120), the image forming apparatus 111 transmits the setting information ("setting file C") to the mobile terminal 120.

On the other hand, as a result of the comparison, when determining that there is a difference between the performance information of the image forming apparatus 111 ("image forming apparatus C") and the performance information of the image forming apparatus 121 ("image forming apparatus D"), the image forming apparatus 111 determines that the setting information ("setting file C") cannot be directly applicable to the image forming apparatus 121 ("image forming apparatus D"). Accordingly, the image forming apparatus 111 changes the setting information included in the instruction to share the setting information (i.e., "setting file C"). In the example of FIG. 3, the setting file C is changed into a setting file C'.

After the change process of the setting information is completed, the image forming apparatus 111 transmits the changed setting information ("setting file C'") to the mobile terminal 120.

Upon receiving the changed setting information ("setting file C'") from the image forming apparatus 111 ("image forming apparatus C"), the mobile terminal 120 stores the changed setting information ("setting file C'") into the setting information data 321 of the mobile terminal 120. After that, the mobile terminal 120 generates print data based on the stored setting information ("setting file C'") and transmits the generated print data to the image forming apparatus 121 ("image forming apparatus D") which is the output destination when a document is printed out by using the image forming apparatus 121.

3. Functional Configuration of the Mobile Terminal

Next, a functional configuration of the mobile terminals 110 and 120 in the image forming system 100 is described. In the above description, it is assumed that the mobile terminal 120 serves as a request source that sends a request to share setting information and the mobile terminal 110 serves as a request destination that receives the request to share the setting information. However, in this embodiment, it is assumed that the mobile terminals 110 and 120 have both the functions as the mobile terminal of the request source and the functions as the mobile terminal of the request destination. Namely, the mobile terminals 110 and 120 can operate not only as the mobile terminal of the request source but also as the mobile terminal of the request destination.

Figure 4:
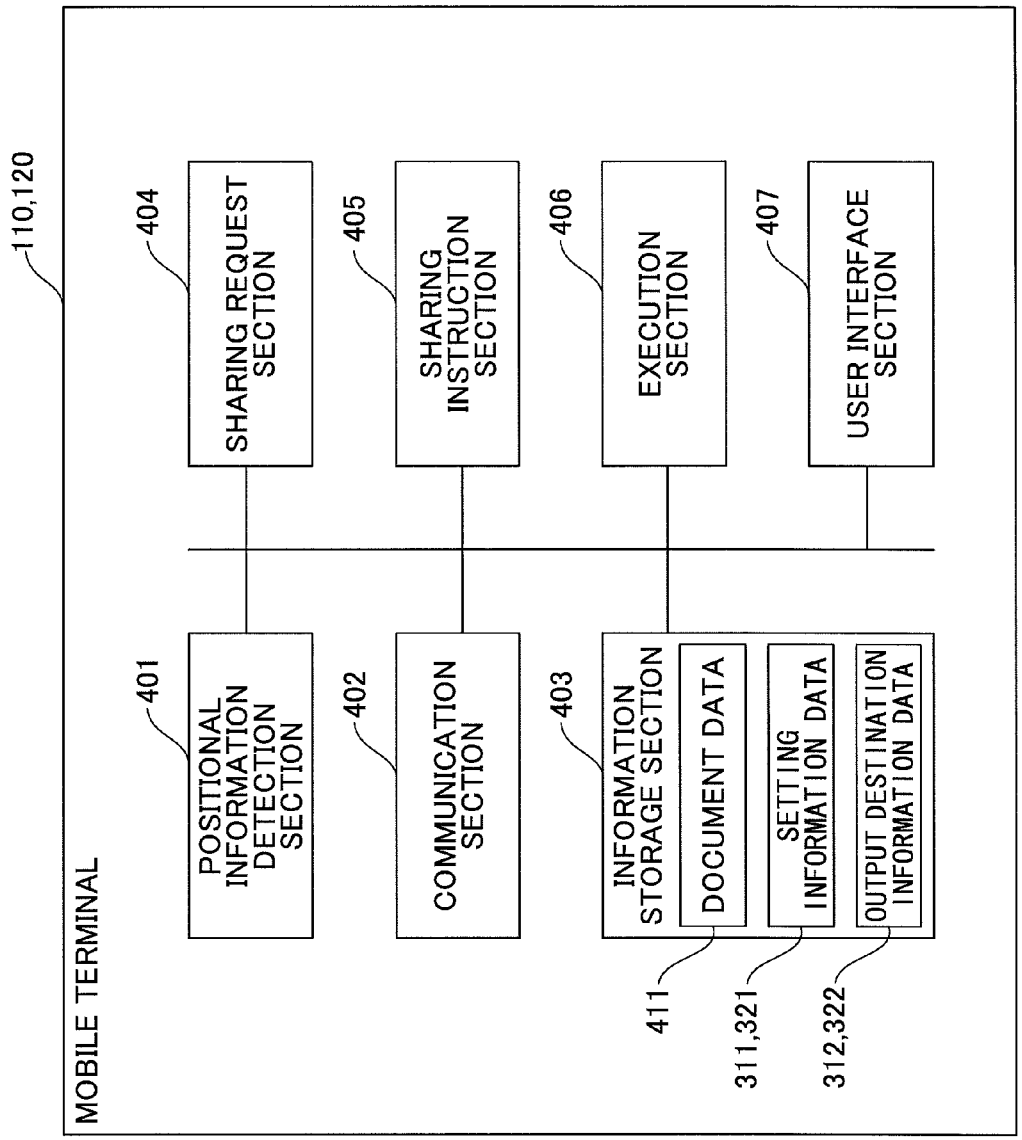
FIG. 4 is a functional configuration of a mobile terminal included in the image forming system.

As illustrated in FIG. 4, each of the mobile terminals 110 and 120 includes a positional information detection section 401, a communication section 402, an information storage section 403, a sharing request section 404, a sharing instruction section 405, an execution section 406, and a user interface section 407.

The positional information detection sections 401 of the mobile terminals 110 and 120 detect the respective current positions of the mobile terminals 110 and 120. Specifically, the positional information detection section 401 detects the current position by using the GPS. However, the method of detecting the current position is not limited to the method of using the GPS. For example, the current position may be detected by using an inertial navigation system (INS). Otherwise, for example, the current position may be detected based on a combination of the GPS and INS.

As another method, the mobile terminals include respective near field communication sections so as to identify the positions of the mobile terminals based on the communication intensity (e.g., radio field intensity or sound volume) of the near field communications (e.g., infrared wireless communication, Bluetooth, or sonic wave).

Here, the "inertial navigation system (INS)" is a known technique that calculate the current position and the current speed only by using an inertial measurement unit (IMU) without any support based on external waves. In this case, the speed is calculated by integrating the acceleration which is detected by an acceleration sensor of the inertial measurement unit (IMU), and the distance is calculated by integrating the speed. Further, the direction is detected by a gyro sensor of the inertial measurement unit (IMU). As a result, the current position relative to a predetermined reference position is calculated by synthesizing vectors that are derived based on the distances and the directions for each of the divided points.

The communication section 402 transmits and receives information to and from the network 150 via the access point 130.

The information storage section 403 stores document data 411 that are to be printed out by the image forming apparatuses 111 and 121, the setting information that is to be used when the document data 411 are printed out, and the setting information data 311 and 321 that are associated with the image forming apparatuses of the application destinations. The information storage section 403 further stores the positional information of the current position detected by the positional information detection sections 401 and the output destination information data 312 and 322 that are associated with the image forming apparatuses of the output destinations identified based on the positional information.

Further, FIG. 5 illustrates a specific example of the "setting file C" of the setting information data 311 stored in the information storage section 403. As illustrated in FIG. 5, the setting file C includes setting values of the items of the performance information of the image forming apparatus C to which the "setting file C" is applied.

The sharing request section 404 sends a request to share the setting information to another mobile terminal (i.e., a request to provide the setting information stored by the other mobile terminal).

Specifically, the sharing request section 404 starts up when receiving input of an instruction from a user via the user interface section 407, and acquires the positional information indicating the current position from the positional information detection section 401. Then, the sharing request section 404 includes the acquired positional information into an acquisition request to acquire the output destination information, and transmits the acquisition request to the server apparatus 140. Further, the sharing request section 404 acquires, as the output destination information, the model number information of the image forming apparatus (e.g., the model number information of the "image forming apparatus D") that is received from the server apparatus 140 in response to the acquisition request of the output destination information. Further, the sharing request section 404 receives the input of designation information from a user, and transmits the request to share the setting information to the mobile terminal 110.

Further, upon receipt of the setting information from the image forming apparatus 111 as a result of the transmission of the request to share the setting information, the sharing request section 404 stores the setting information in association with the information of the application destination into the setting information data 321 of the information storage section 403.

Upon the receipt of the request to share the setting information from the other mobile terminal, the sharing instruction section 405 selects the setting information to be shared based on the information included in the request to share the setting information (designated information). Further, the sharing instruction section 405 transmits, as an instruction to share the setting information, the selected setting information along with the other information included in the request to share the setting information. The transmission destination of the instruction to share the setting information is the image forming apparatus that has it stored in association with the setting information selected as the setting information to be shared in the setting information data 311.

The execution sections 406 cause the image forming apparatuses 111 and 121 to execute a print process of document data. Specifically, the execution section 406 starts up when an instruction is input from a user via the user interface section 407, and converts the document data 411 into print data based on the setting information (i.e., the setting information to be applied to the image forming apparatus of the output destination corresponding to the current positional information). Further, the execution sections 406 transmits the converted print data to the image forming apparatus of the output destination corresponding to the current positional information.

The user interface section 407 is used when a user inputs various instructions. Further, the user interface section 407 displays an inner state of the mobile terminals 110 and 120. The sharing request section 404 and the execution section 406 are started up based on a user's instructions via the user interface section 407.

4. Functional Configuration of the Image Forming Apparatus

Next, a functional configuration of the image forming apparatuses 111 and 121 is described. FIG. 6 illustrates a functional configuration of the image forming apparatuses 111 and 121.

The image forming apparatuses 111 and 121 are digital multifunctional peripherals called "multifunctional peripheral (MFP)" having a print function, a scanner function, a copy function, and a facsimile function.

As illustrated in FIG. 6, each of the image forming apparatuses 111 and 121 includes a communication section 601, a printer section 602, a scanner section 603, a facsimile communication section 604, an operation section 605, an RF tag 606, a central processing unit (CPU) 607, a Read-Only memory (ROM) 608, a Random Access Memory (RAM) 609, a non-volatile memory 610, and a storage device 611.

The communication section 601 controls communications with the apparatuses connected via the network 150. The printer section 602 prints out a color image or a monochrome image on a recording medium by using cyan, magenta, yellow, and black toner. Further, the printer section 602 sorts and staples the printed-out recording media, and punches the recording media to be printed out.

The scanner section 603 reads a document image by using color CCD line sensors having LED arrays arranged in one dimension as a light source, and generates the document data. Further, the scanner section 603 performs A (analog)/D (Digital) conversion on the R (Red), G (Green), and B (Blue) analog image signals output from the LED arrays into the digital image data, and outputs the converted digital image data.

The facsimile communication section 604 transmits and receives facsimile data to and from the external apparatuses connected via a line.

The operation section 605 includes a hard key, an LED, a touch-panel screen, etc., so that a user can input various instructions and settings when using the print function, the scanner function, the copy function, and the facsimile function. Further, the operation section 605 displays job history, an apparatus state, the setting information, etc., which are the inner information of the image forming apparatuses 111 and 121.

The CPU 607 executes various control programs stored in the ROM 608 and an Operating System (OS). The control programs stored in the ROM 608 include a sharing application 620 to realize the sharing process of the setting information.

The sharing application 620 includes a program to function as an access section 621 and a program to function as a performance information request section 622 when programs are executed by the CPU 607. The sharing application 620 further includes a program to function as a performance information response section 623, a program to function as a setting information change section 624, and a program to function as an output section 625.

When an instruction to share the setting information is received from the mobile terminal 110, the access section 621 accesses the image forming apparatus that is identified based on the output destination information included in the instruction. Further, when the change process to change the setting information is finished, the access section 621 accesses the mobile terminal based on the transmission destination information included in the instruction to share the setting information.

The performance information request section 622 sends a request to provide the performance information to the image forming apparatus accessed by the access section 621 based on the output destination information.

When the request to provide performance information is received, the performance information response section 623 reads the performance information of the image forming apparatus, and transmits the performance information to the image forming apparatus having sent the request to provide the performance information.

The setting information change section 624 determines whether the setting information, which is included in the instruction to share the setting information from the mobile terminal 110, can be applied to the image forming apparatus that is identified by the output destination information, and changes the setting value on a necessary basis.

Specifically, the setting information change section 624 compares the performance information acquired from the image forming apparatus 121 with the performance information of the image forming apparatus, and determines whether there is a setting value that cannot be applied to the image forming apparatus 121. When determining that there is setting value that cannot be applied, the setting information change section 624 deletes the setting value or changed the setting value into an appropriate setting value. On the other hand, when determining that all the setting values described in the setting information can be applied to the image forming apparatus 121, the setting information change section 624 does not perform a change process on the setting information.

Figure 7A:
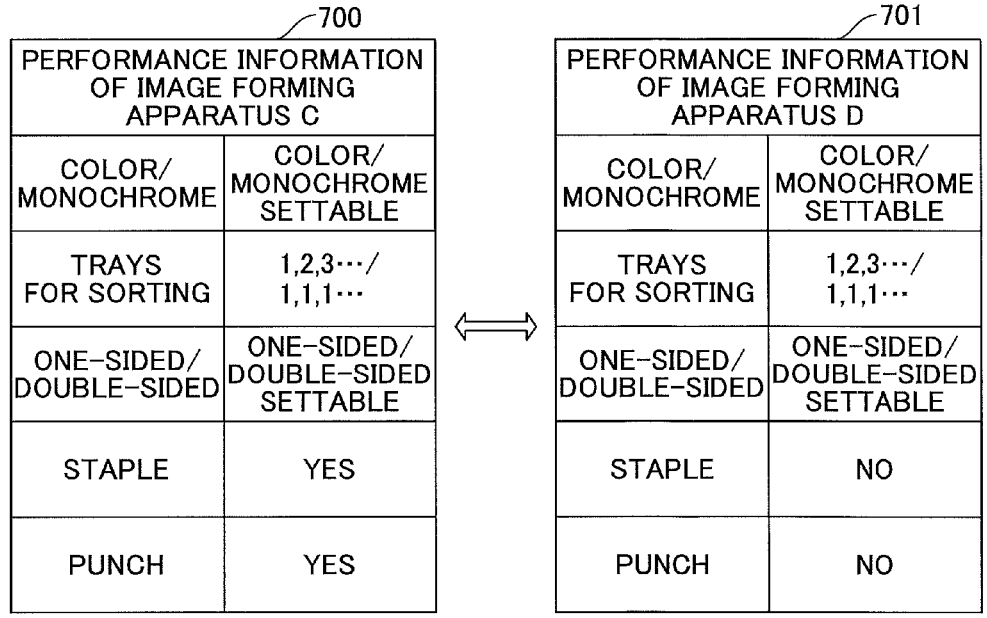
FIGS. 7A and 7B illustrate change processes of the setting information.
Figure 7B:
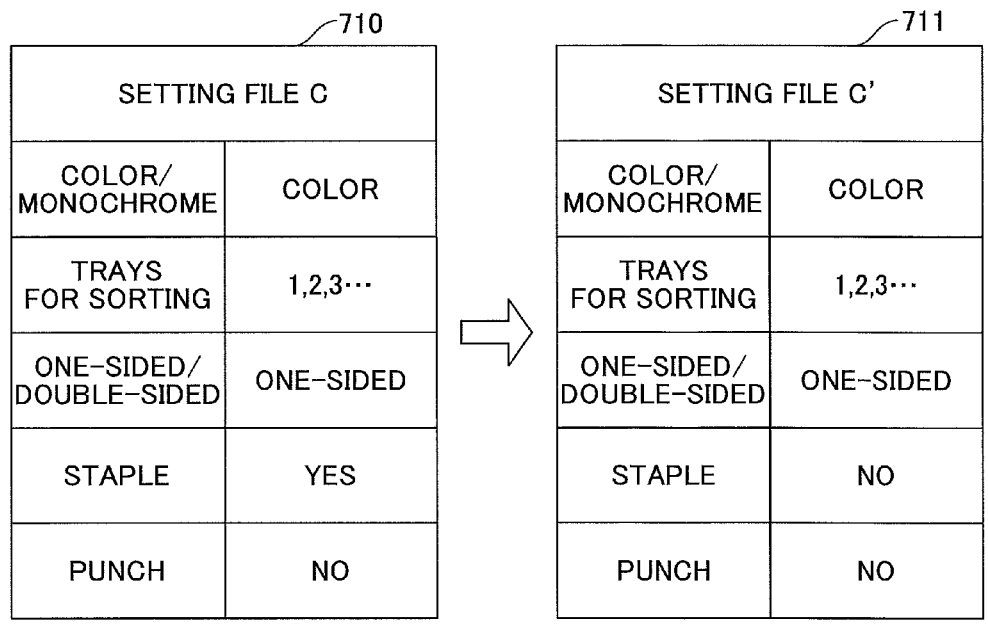

FIGS. 7A and 7B illustrate the change processes of changing the setting information by the setting information change section 624. FIG. 7A illustrates performance information 700 of the image forming apparatus 111 ("image forming apparatus C") and performance information 701 of the image forming apparatus 121 ("image forming apparatus D").

In the example of FIG. 7A, the image forming apparatus 111 ("image forming apparatus C") has the staple function and the punch function but the image forming apparatus 121 ("image forming apparatus D") does not have the staple function and the punch function.

FIG. 7B illustrates a case where, based on the comparison between the performance information 700 and the performance information 701 in FIG. 7A, the setting information 710 ("setting file C"), which is selected as the setting information to be shared, is changed into the setting information 711 ("setting file C'"). As described above, image forming apparatus 121 ("image forming apparatus D") does not have the staple function and the punch function, so that the setting value indicating that the staple function is included ("YES") in the setting file C is changed into the setting value indicating that the staple function is not included ("NO") in the setting file C'.

Referring back to the description of FIG. 6, when the change process of the setting value is finished in the setting information change section 624, the output section 625 outputs the changed setting information 711 ("setting file C'") to the mobile terminal 120 that is accessed by the access section 621 based on the transmission destination information.

The RAM 609 is used as a working memory temporarily storing various data when the CPU 607 executes the various control programs.

The non-volatile memory 610 is a rewritable memory that can hold data even when power to it is cut off, so that the non-volatile memory 610 stores various setting information, etc.

The storage device 611 is a non-volatile storage device having a large capacity, so that the storage device 611 stores, for example, the data to be used when the print function, the scanner function, the copy function, and the facsimile function are executed.

5. A Hardware Configuration of the Server Apparatus

Figure 8:
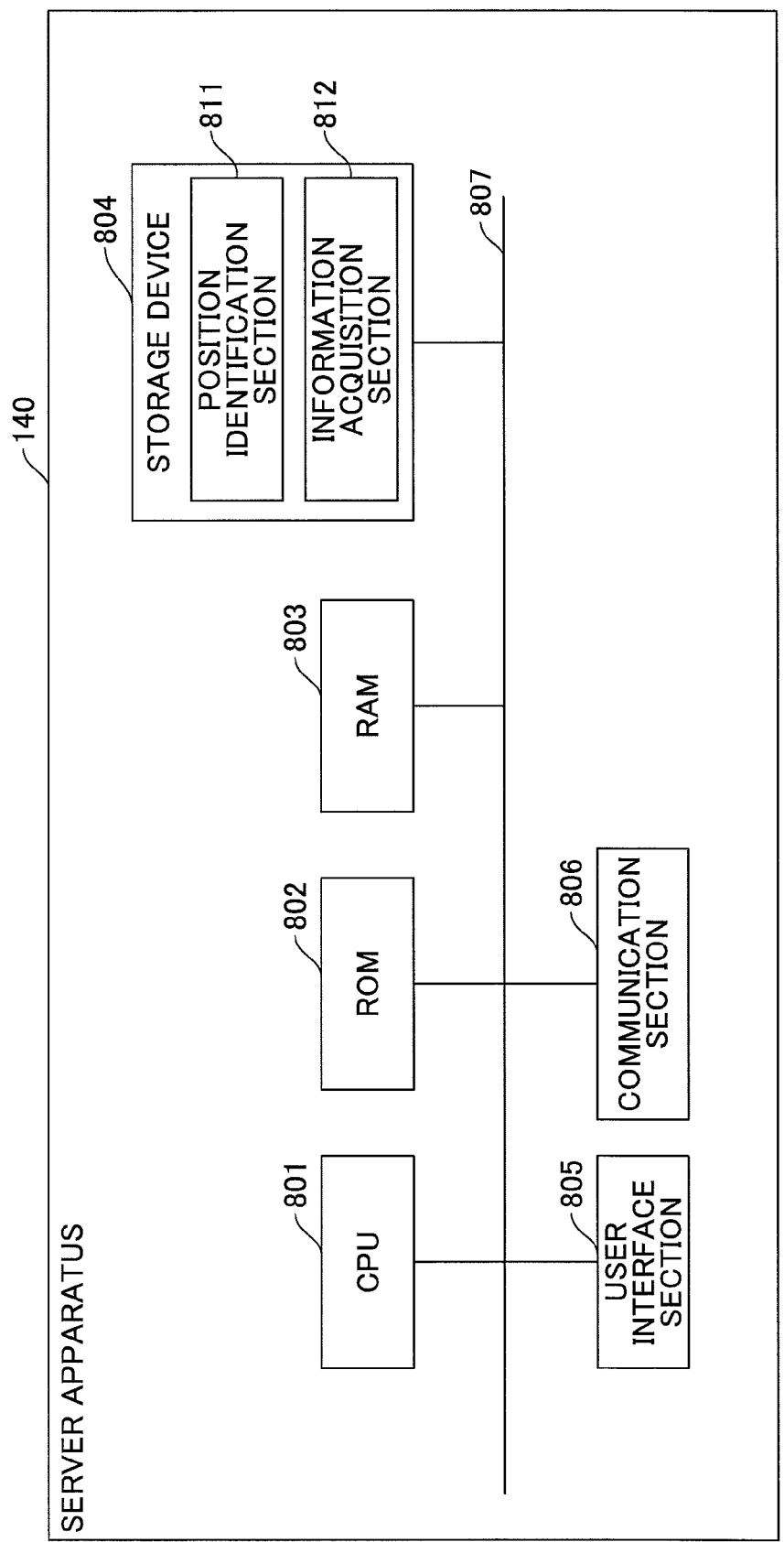
FIG. 8 illustrates a hardware configuration of a server apparatus included in the image forming system.

Next, a hardware configuration of the server apparatus 140 is described. FIG. 8 illustrates a hardware configuration of the server apparatus 140.

As illustrated in FIG. 8, the server apparatus 140 includes a CPU 801, a ROM 802, a RAM 803, a storage device 804, a user interface section 805, and a communication section 806. Those elements of the server apparatus 140 are connected to each other via a bus 807.

The CPU 801 is a computer that executes a program that functions as a position identification section 811 and a program that functions as an information acquisition section 812, the programs being stored in the storage device 804.

When the program that functions as the position identification section 811 is executed by the CPU 801, the server apparatus 140 identifies the RFID reader that is installed near the mobile terminal 120. Specifically, based on the positional information of the mobile terminal 120 included in the instruction to acquire the output destination information received from the mobile terminal 120 and the layout data 200, the server apparatus 140 identifies the RFID reader (here "RFID reader 122") that is installed near the mobile terminal 120.

Further, by executing the program that functions as an information acquisition section 812 by the CPU 801, the server apparatus 140 starts up the identified RFID reader 122.

By starting up the identified RFID reader 122, the RFID reader 122 receives the information (e.g., model number information) stored in the RFID tag included in the image forming apparatus near the RFID reader 122, so that the server apparatus 140 acquires the information from the RFID reader 122. By doing this, the server apparatus 140 can recognize the image forming apparatus ("image forming apparatus D") that is installed near the mobile terminal 120. Namely, the server apparatus 140 can recognize the image forming apparatus ("image forming apparatus D") that is the output destination based on the current positional information of the mobile terminal 120.

The ROM 802 is a non-volatile memory. The ROM 802 stores various programs, data, etc., that are necessary for the CPU 801 to execute the programs stored in the storage device 804. Specifically, the ROM 802 stores, for example, boot programs such as a basic input/output system (BIOS) and an extensible random firmware interface (EFI).

The RAM 803 is a main memory such as a dynamic random access memory (DRAM) or a static random access memory (SRAM). The RAM 803 functions as a working area that is developed when the programs stored in the storage device 804 are executed by the CPU 801.

The storage device 804 stores the program that functions as the position identification section 811 and the program that functions as the information acquisition section 812. The user interface section 805 is used to input various instructions to the server apparatus 140 and displays the inner state of the server apparatus 140.

The communication section 806 receives the instruction to acquire the output destination information transmitted from the mobile terminal 120 and transmits the information (e.g., model number information), which is acquired from the image forming apparatus ("image forming apparatus D") of the output destination, to the mobile terminal 120.

Figure 9:
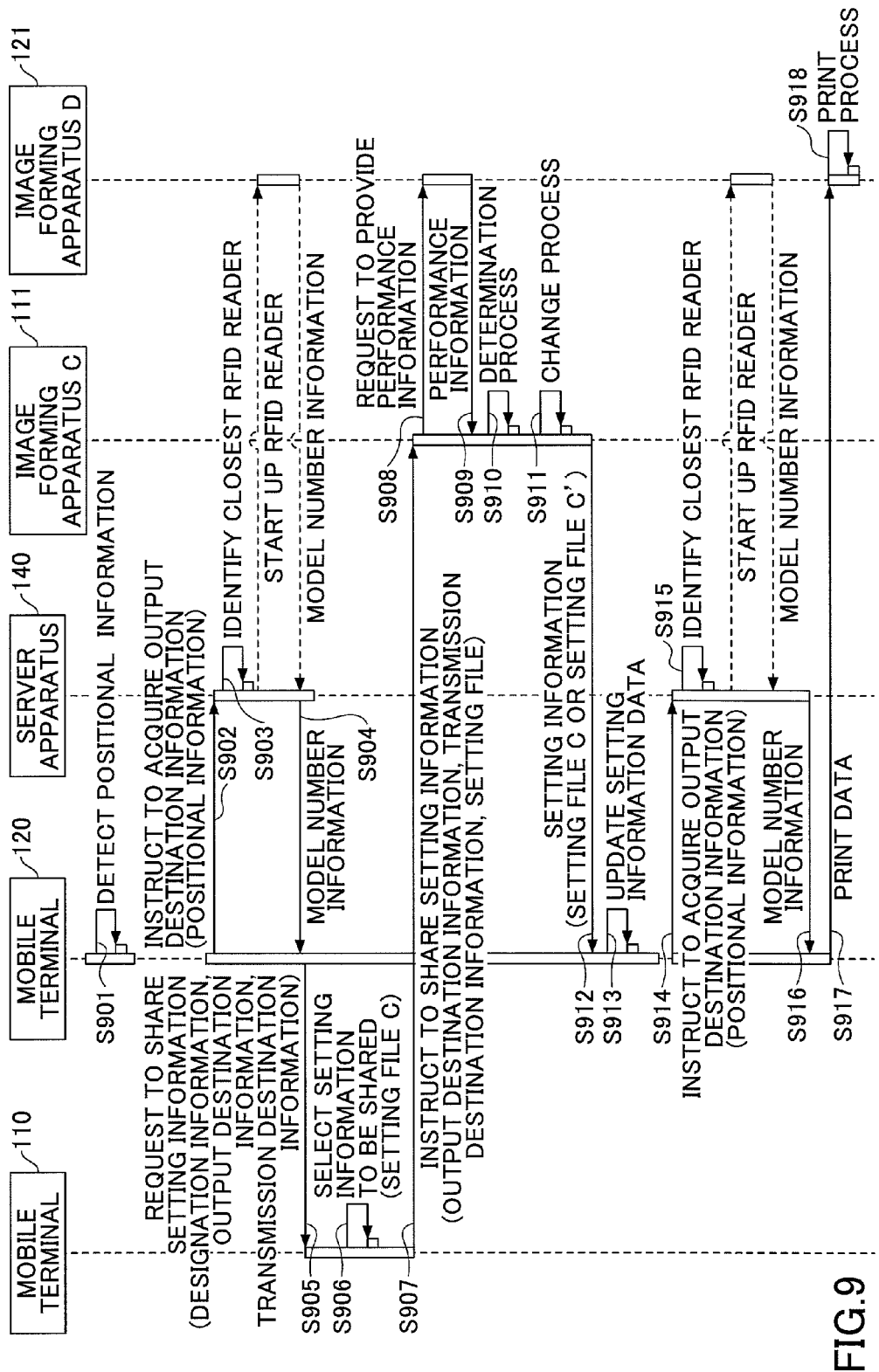
FIG. 9 is a sequence diagram illustrating a flow of the sharing process of the setting information in the image forming system.

6. Flow of the Sharing Process of the Setting Information in the Image Forming System Next, a flow of the sharing process of the setting information in the image forming system 100 is described. FIG. 9 is a sequence diagram of a flow of the sharing process of the setting information in the image forming system 100.

First, by starting up the positional information detection sections 401 of the mobile terminal 120, the detection of the positional information is started (step S901). After that, when the sharing request section 404 is started up by a user's instruction, the mobile terminal 120 sends a request to acquire the output destination information to the server apparatus 140 (step S902). Here, the instruction includes the positional information detected by the positional information detection sections 401.

The server apparatus 140, which has received the instruction to acquire the output destination information from the mobile terminal 120, starts up the position identification section 811. When the position identification section 811 is started up, the server apparatus 140 identifies the RFID reader that is installed near the mobile terminal 120 (step S903).

Further, the server apparatus 140 starts up the information acquisition section 812 so that the information acquisition section 812 acquires the model number information that is received by starting up the identified RFID reader ("RFID reader 122") (the model number information of the "image forming apparatus D"). The acquired model number information is transmitted from the server apparatus 140 to the mobile terminal 120, so that the acquired model number information is used as the output destination information (step S904).

When the mobile terminal 120, that has acquired the output destination information, receives the input of the designation information from a user, the mobile terminal 120 sends the request to share the setting information to the mobile terminal 110 (step S905). As described above, the request to share the setting information includes the designation information ("image forming apparatus C"), the output destination information ("image forming apparatus D"), and the transmission destination information ("address information of the mobile terminal 120").

The mobile terminal 110, which has received the request to share the setting information, starts up the sharing instruction section 405. Then, the mobile terminal 110 selects the setting information ("setting file C") that corresponds to the designation information ("image forming apparatus C"), as the setting information to be shared, from among the (plural) setting information stored in the setting information data 311 of the mobile terminal 110 (step S906).

Further, the mobile terminal 110 sends the instruction to share the setting information to the image forming apparatus ("image forming apparatus C") that is associated with the setting information to be shared in the setting information data 311 (step S907). As described above, the instruction to share the setting information includes the setting information to be shared ("setting file C"), the information included in the request to share the setting information (output destination information ("image forming apparatus D")), and the transmission destination information ("address information of the mobile terminal 120").

In the image forming apparatus 111 ("image forming apparatus C") that has received the instruction to share the setting information, the access section 621 accesses the image forming apparatus 121 ("image forming apparatus D") based on the output destination information included in the instruction. Further, the performance information request section 622 transmits the request to provide the performance information to the accessed image forming apparatus 121 ("image forming apparatus D") (step S908).

In the image forming apparatus 121 ("image forming apparatus D") that has received the request to provide the performance information, the performance information response section 623 reads the performance information of the image forming apparatus 121 ("image forming apparatus D"). The read performance information is transmitted to the image forming apparatus 111 ("image forming apparatus C") (step S909).

In the image forming apparatus 111 ("image forming apparatus C") that receive the performance information, the setting information change section 624 is started up so that the setting information change section 624 compares the acquired performance information with the performance information of the image forming apparatus 111 ("image forming apparatus C") (step S910). As a comparison result, when determining that it is necessary to change the setting information, the setting information change section 624 changes the setting information ("setting file C") (step S911). On the other hand, when determining that it is not necessary to change the setting information, the setting information change section 624 does not change the setting information.

When the process of the setting information change section 624 is finished, the access section 621 accesses the mobile terminal 120 based on the transmission destination information ("address information of the mobile terminal 120"). Further, the output section 625 transmits the setting information ("setting file C" or "setting file C'") that has changed on an as necessary basis (step S912).

The mobile terminal 120, that has received the setting information from the image forming apparatus 111 ("image forming apparatus C"), stores the setting information in association with the output destination information ("image forming apparatus D") into the setting information data 321 of the information storage section 403 (step S913).

After that, the execution section 406 of the mobile terminal 120 is started up and the printing out of the document data 411 stored in the information storage section 403 is instructed by a user, the execution section 406 acquires the current positional information from the positional information detection sections 401. Further, in steps S914 through S916, by performing a process similar to that in step S902 through S904, the output destination information ("image forming apparatus D") is acquired. Further, the setting information ("setting file C") is read from the setting information data 321, the setting information ("setting file C") being used when the image forming apparatus ("image forming apparatus D"), that is identified by the output destination information, is printed out.

Then, the document data 411 are converted into the print data based on the setting information ("setting file C"), so that the print data are transmitted to the image forming apparatus 121 ("image forming apparatus D") which is the output destination via the communication section 402 (step S917).

In the image forming apparatus 121 that has received the print data, the printer section 602 starts up and prints out the print data (step S918).

FIGS. 10A through 10C illustrate transitions of the setting information data 321 stored in the mobile terminal 120. Before the sharing process of the setting information, the setting information data 321 are described as illustrated in FIG. 10A (same as FIG. 3). On the other hand, due to the acquisition of the output destination information in step S904, the setting information data 321 further includes the "image forming apparatus D" as a new application destination (see FIG. 10B).

Further, due to the update of the setting information data 321 in step $911, the "setting file C'" is described as the setting information corresponding to the "image forming apparatus D".

7. Points

As is obvious from the above description, in an image forming system according to this embodiment:

the output destination can be automatically selected based on the positional information of the current position;

the request to share the setting information includes the output destination information, the designation information, and the transmission destination information and is transmitted;

upon the receipt of the request to share the setting information, the setting information to be shared can be selected based on the designation information;

the instruction to share the setting information includes the output destination information, the transmission destination information, and the selected setting information and is transmitted to the image forming apparatus which is associated with the selected setting information;

upon the receipt of the instruction to share the setting information, an access is made to the other image forming apparatus based on the output destination information and the performance information of the other image forming apparatus is acquired, so that it becomes possible to determine whether it is necessary to change the setting information included in the instruction to share the setting information;

when determining that it is necessary to change the setting information, the setting information is changed so as to be applicable to the image forming apparatus identified based on the output destination information; and the setting information having the changed setting value is transmitted to the mobile terminal corresponding to the transmission destination information included in the instruction to share the setting information.

Due to the features described above, it becomes possible to change the setting information in accordance with the performance information of the image forming apparatus of the output destination by which the mobile terminal, which sends the request to share the setting information, prints out in the case where the setting information is to be shared between the mobile terminals.

As a result, it becomes no longer necessary for a user who receives the setting information to correct (modify) the setting information in accordance to the performance information of the image forming apparatus of the output destination to print out. Accordingly, it becomes possible to improve the convenience of the setting operation on the mobile terminal.

Second Embodiment

In the first embodiment, a comparison is made between the performance information of the image forming apparatus that sends a request to provide the performance information and the performance information of the image forming apparatus that receives the request to provide the performance information, so that, when there is a difference in a comparison result, the setting information is automatically changed.

However, the present invention is not limited to this configuration. For example, the mobile terminal, which has sent the instruction to share the setting information, may determine whether the setting information is to be changed. Then, when the mobile terminal permits the change of the setting information, the image forming apparatus may change the setting information.

Otherwise, after determining whether the setting information is to be changed, the mobile terminal may change the setting information, so that the changed setting information can be transmitted to the image forming apparatus.

FIG. 11 is a sequence diagram illustrating a flow of the sharing process of the setting information in the image forming system. The descriptions in steps S901 through S910 and steps S912 through S918 of the sequence diagram in FIG. 11 are already described with reference to the sequence diagram in FIG. 9. Therefore, the differences from FIG. 9 are herein described.

In step S910 of FIG. 11, when determining that it is necessary to change the setting information, the image forming apparatus 111 ("image forming apparatus C") transmits an alarm instruction to the mobile terminal 110 (step S1101).

The mobile terminal 110, that has received the alarm instruction, displays the alarm instruction and receives a user's input whether to permit the automatic change of the setting information (step S1102).

When receiving the user's input to permit the automatic change of the setting information, the mobile terminal 110 transmits the change instruction to the image forming apparatus 111 ("image forming apparatus C") (step S1103). The image forming apparatus 111 ("image forming apparatus C"), that has received the change instruction, changes the setting information (step S1104).

On the other hand, when receiving the user's input indicating that the user does not permit the automatic change of the setting information, the mobile terminal 110 transmits an instruction indicating that the change is unnecessary to the image forming apparatus 111 ("image forming apparatus C") (step S1105). In this case, the image forming apparatus 111 ("image forming apparatus C") does not change the setting information.

However, in a case where the user, who has input an instruction that does not permit the automatic change, changes the setting information on the mobile terminal 110 (step S1106), the mobile terminal 110 transmits the changed setting information to the image forming apparatus 111 ("image forming apparatus C") again (step S1107).

The image forming apparatus 111 ("image forming apparatus C") transmits the changed setting information to the mobile terminal 120 based on the transmission destination information (step $912).

As obvious from the above description, the image forming system according to this embodiment further includes the following features in addition to the features in the first embodiment:

when the image forming apparatus, which sends the request to provide the performance information, determines that it is necessary to change the setting information, the image forming apparatus transmits an alarm instruction to the mobile terminal that has sent the instruction to share the setting information; and the setting information is changed based on the instruction indicating whether to permit the change of the setting information from the mobile terminal that has transmitted the instruction to share the setting information.

By doing this, it becomes possible for the mobile terminal, which provides the setting information in sharing the setting information, to manage whether to change the setting information.

Third Embodiment

In the first and the second embodiments, the image forming apparatus that receives the instruction to share the setting information directly transmits the setting information to be shared to the mobile terminal which is the request source having sent the request to share the setting information. However, the present invention is not limited to this configuration.

For example, the image forming apparatus may transmit the setting information to the server apparatus 140, so that the server apparatus 140 can transmit the setting information to the mobile terminal.

Figure 12:
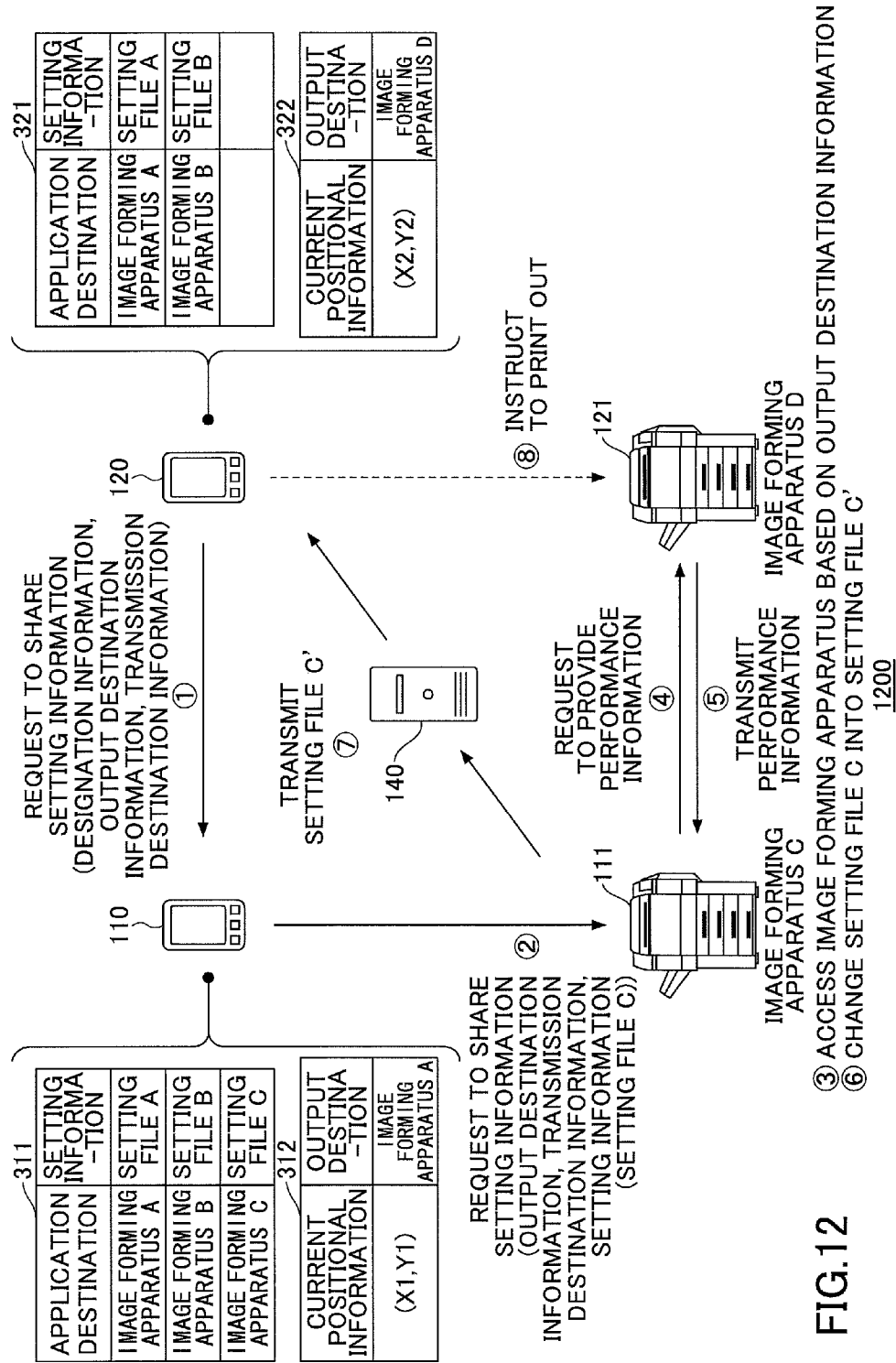
FIG. 12 schematically illustrates a procedure of the sharing process of the setting information and transmission paths of the various information in the image forming system.

Procedure of Sharing Process of Setting Information and Transmission Paths of Various Information in Image Forming System FIG. 12 schematically illustrates a procedure of the sharing process of the setting information and the transmission paths of various information in an image forming system 1200. In the following, differences from the configuration in FIG. 3 are mainly described.

As illustrated in FIG. 12, the image forming apparatus 111 ("image forming apparatus C"), which receives the instruction to share the setting information, receives the performance information from the image forming apparatus 121 ("image forming apparatus C") and changes the setting information. After that, the image forming apparatus 111 ("image forming apparatus C") transmits the changed setting information to the server apparatus 140.

As described above, by transmitting the setting information from the image forming apparatus 111 ("image forming apparatus C") to the server apparatus 140, it becomes no longer necessary to include the transmission destination information in the request to share the setting information and the instruction to share the setting information. This is because the image forming apparatus 111 ("image forming apparatus C") can transmit the setting information to the server apparatus 140 regardless of the mobile terminal that sends the request to share the setting information. Further, since it becomes no longer necessary to include the transmission destination information, it becomes possible to reduce an amount of the information that is transmitted and received between the mobile terminals. Further, in this case, the address information of the mobile terminal is not transmitted and received. Therefore, it is desirable from a security point of view.

In this regard, when the mobile terminal 120 starts up the sharing request section 404 and transmits the instruction to acquire the output destination information, the server apparatus 140 transmits the model number information to the mobile terminal 120 as the response to the instruction. Namely, the server apparatus 140 can recognize in advance the address information, that is to be used to transmit the setting information to the mobile terminal 120 that sends the request to share the setting information, as the response destination in response to the instruction to acquire the output destination information. Therefore, when receiving the setting information from the image forming apparatus 111 ("image forming apparatus C"), the server apparatus 140 transmits the received setting information to the response destination in response to the instruction to acquire the output destination information.

Flow of Sharing Process of Setting Information in an Image Forming System

Figure 13:
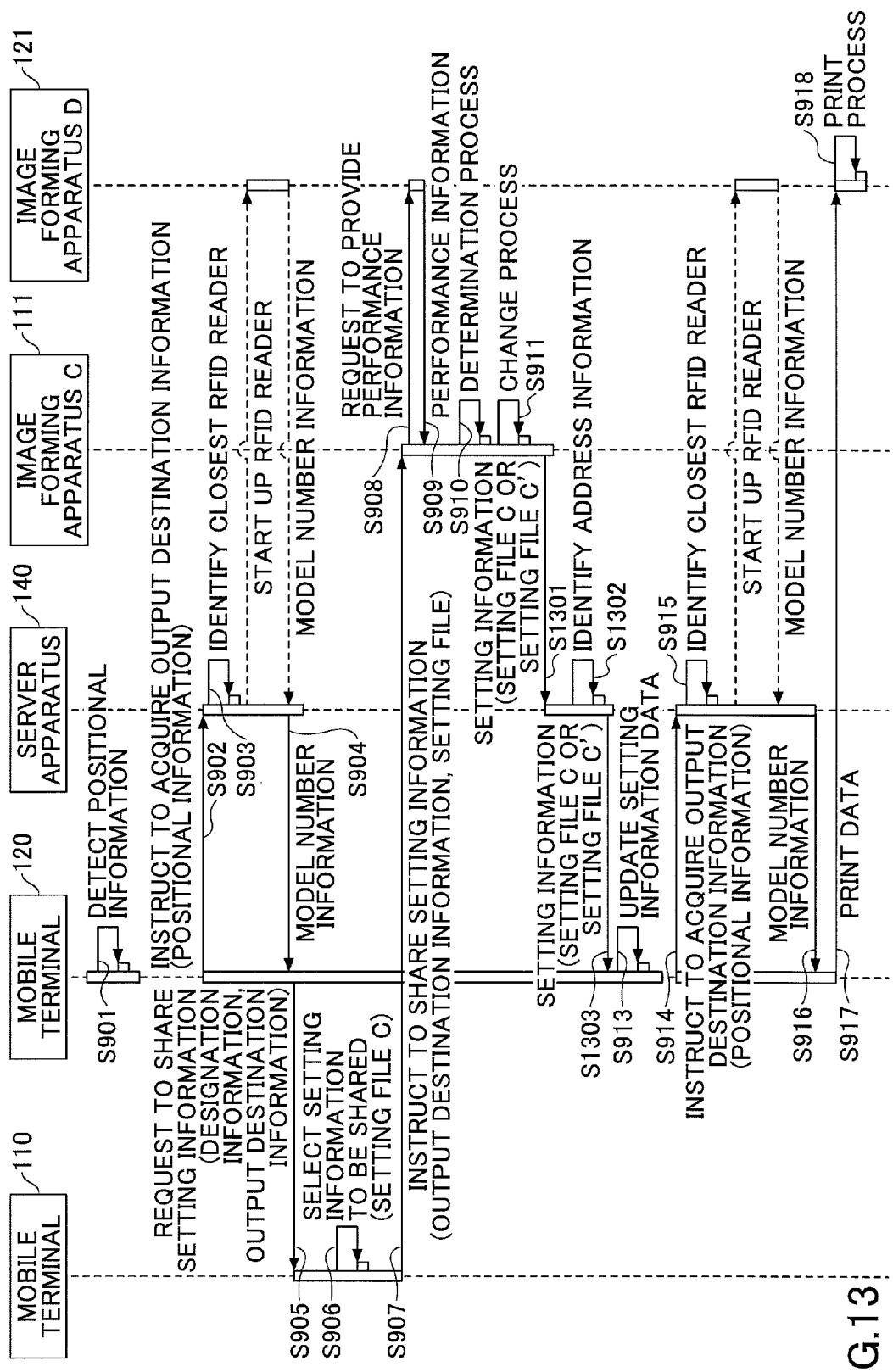
FIG. 13 is still another sequence diagram illustrating a flow of the sharing process of the setting information in the image forming system.

FIG. 13 is a sequence diagram illustrating a flow of the sharing process of the setting information in the image forming system 1300. However, the flow of the sharing process of the setting information in the image forming system 1300 in the sequence diagram of FIG. 13 is similar to that of the image forming system 100 described in the first embodiment with reference to FIG. 9. Therefore, differences from the sequence diagram of FIG. 9 are mainly described.

Specifically, in the sequence diagram of FIG. 13, the differences from that of FIG. 9 are in steps S1301 through S1303. In step S1301, the server apparatus 140 receives the setting information from the image forming apparatus 111 ("image forming apparatus C").

Figure 14:
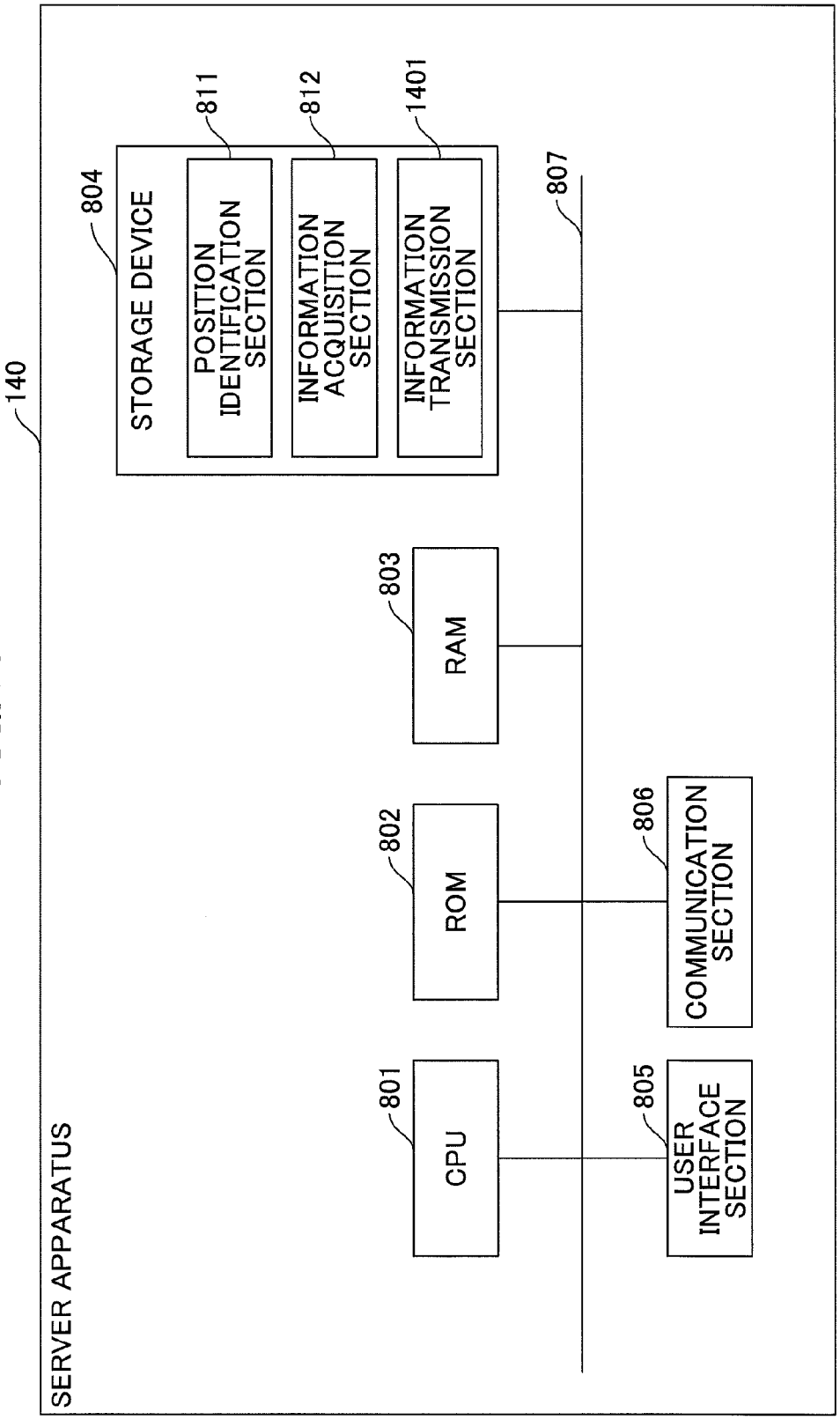
FIG. 14 illustrates a hardware configuration of a server apparatus.

In step S1302, the server apparatus 140 identifies the address information of the mobile terminal that has sent the instruction to acquire the output destination information. Further, in step S1303, the server apparatus 140 transmits the received setting information based on the identified address information of the mobile terminal. Hardware configuration of the server apparatus Next, a hardware configuration of the server apparatus 140 in the image forming system 1200 according to this embodiment is described. FIG. 14 illustrates a hardware configuration of the server apparatus 140 in the image forming system 1200 according to this embodiment.

However, the hardware configuration of the server apparatus 140 in FIG. 14 is similar to the hardware configuration of the server apparatus 140 which are described with reference to FIG. 8 in the first embodiment. Therefore, differences from the configuration of FIG. 8 are described.

In FIG. 14, when receiving the setting information from the image forming apparatus 111, an information transmission section 1401 identifies the mobile terminal to which the information acquisition section 812 transmits the model number information in response to the instruction to acquire the output destination information. Then, the server apparatus 140 transmits the received setting information to the identified mobile terminal.

As described above, in the image forming system according to this embodiment, it becomes possible to reduce the amount of the information to be included in the request to share the setting information and the instruction to share the setting information. Further, in the case of the image forming system according to this embodiment, the address information of the mobile terminal is not transmitted and received. Therefore, it is desirable from a security point of view.

Fourth Embodiment

In the first and the second embodiments, the image forming apparatus that receives the instruction to share the setting information directly transmits the setting information to be shared to the mobile terminal which is the request source having sent the request to share the setting information. However, the present invention is not limited to this configuration.

For example, the setting information to be shared may be transmitted to the mobile terminal that has sent the instruction to share the setting information, so that the mobile terminal that has sent the instruction to share the setting information can send the setting information to be shared to the mobile terminal that has sent the request to share the setting information.

Figure 15:
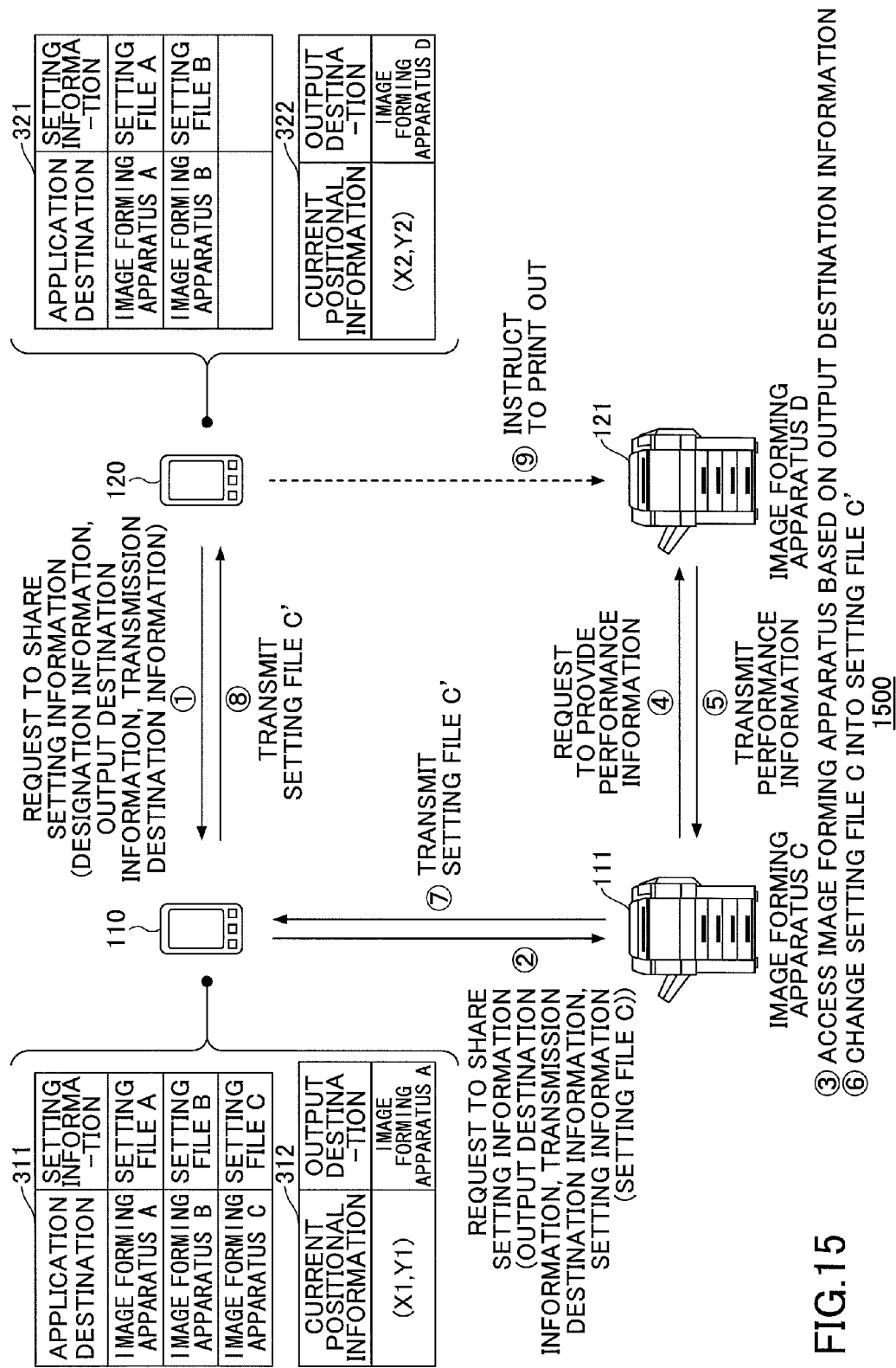
FIG. 15 schematically illustrates another procedure of the sharing process of the setting information and transmission paths of the various information in the image forming system.

Procedure of Sharing Process of Setting Information and Transmission Paths of Various Information in Image Forming System FIG. 15 schematically illustrates a procedure of the sharing process of the setting information and the transmission paths of various information in an image forming system 1500. In the following, differences from the configuration in FIG. 3 are mainly described.

As illustrated in FIG. 15, the image forming apparatus 111 ("image forming apparatus C"), which receives the instruction to share the setting information, receives the performance information from the image forming apparatus 121 ("image forming apparatus C") and changes the setting information. After that, the image forming apparatus 111 ("image forming apparatus C") transmits the changed setting information to the mobile terminal 110.

As described above, by transmitting the setting information from the image forming apparatus 111 ("image forming apparatus C") to the mobile terminal 110, it becomes no longer necessary to include the transmission destination information in the request to share the setting information and the instruction to share the setting information. This is because the image forming apparatus 111 ("image forming apparatus C") can transmit the setting information to the mobile terminal that sends the instruction to share the setting information regardless of the mobile terminal that sends the request to share the setting information. Further, since it becomes no longer necessary to include the transmission destination information, it becomes possible to reduce an amount of the information that is transmitted and received between the mobile terminals in sharing the setting information. Further, in this case, the address information of the mobile terminal is not transmitted and received. Therefore, it is desirable from a security point of view.

Figure 16:
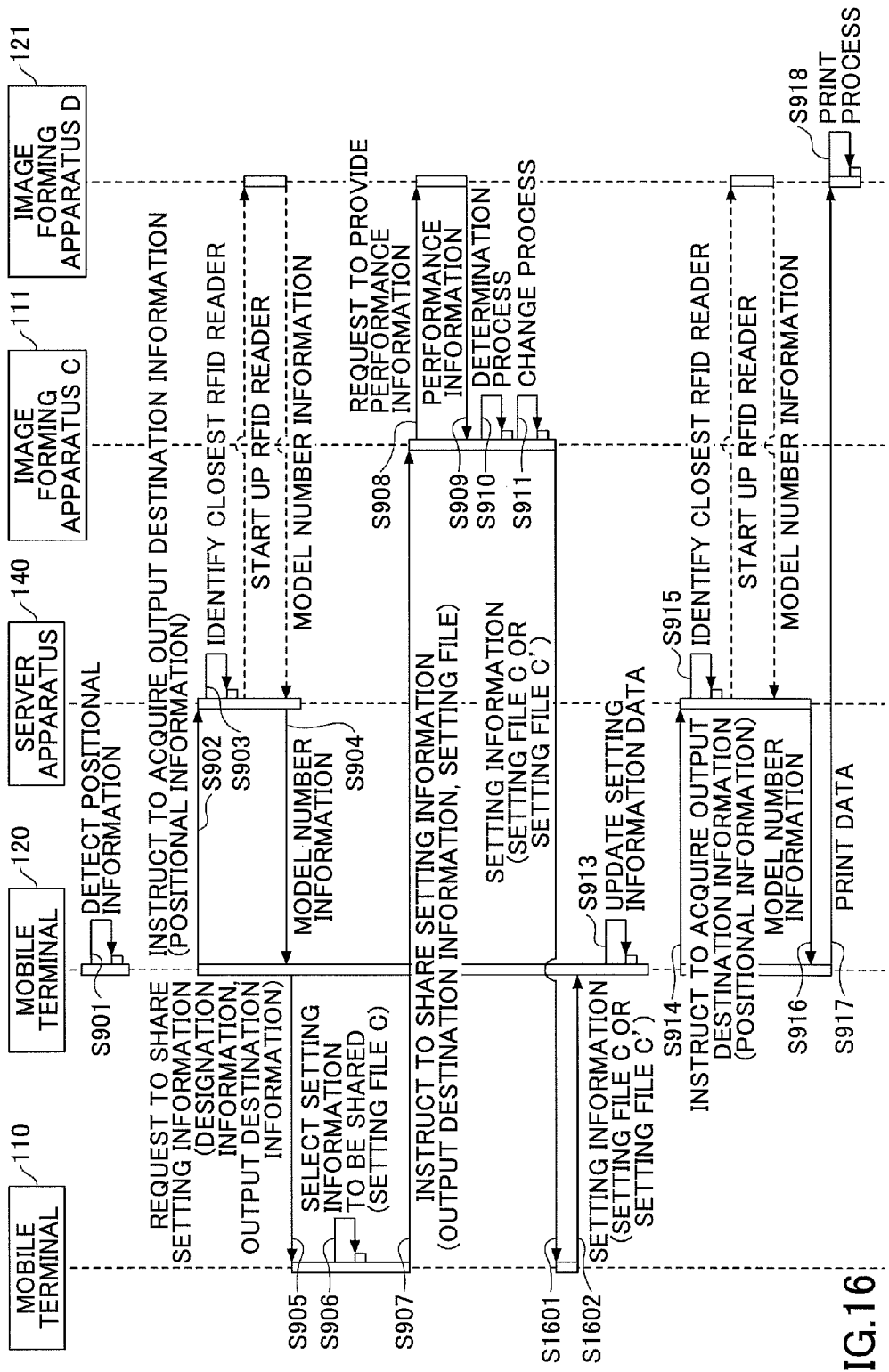
FIG. 16 is still another sequence diagram illustrating a flow of the sharing process of the setting information in the image forming system.

Here, when receiving the setting information, the mobile terminal 110 transmits the received setting information to the mobile terminal that has sent the request to share the setting information. Flow of sharing process of setting information in an image forming system FIG. 16 is a sequence diagram illustrating a flow of the sharing process of the setting information in the image forming system 1500. However, the flow of the sharing process of the setting information in the image forming system 1500 in the sequence diagram of FIG. 16 is similar to that of the image forming system 100 described in the first embodiment with reference to FIG. 9. Therefore, differences from the sequence diagram of FIG. 9 are mainly described.

Specifically, in the sequence diagram of FIG. 16, the differences from that of FIG. 9 are in steps S1601 and S1602. In step S1601, the image forming apparatus 111 transmits the received setting information to the mobile terminal 110 that is the instruction source to send the instruction to share the setting information.

In step S1602, the mobile terminal 110 transmits the received setting information to the mobile terminal 120 that is the request source to send the request to share the setting information.

As described above, in the image forming system according to this embodiment, it becomes possible to reduce the amount of the information to be included in the request to share the setting information and the instruction to share the setting information. Further, in the case of the image forming system according to this embodiment, the address information of the mobile terminal is not transmitted and received. Therefore, it is desirable from a security point of view.

Fifth Embodiment

In the first embodiment, a case is described where the mobile terminal that sends the request to share the setting information does not include the setting information that is applicable to the image forming apparatus that is the output destination of the mobile terminal that sends the request to share the setting information.

However, the present invention is not limited to this configuration. Specifically, there are many cases where the mobile terminal that sends the request to share the setting information does include the setting information that is applicable to the image forming apparatus that is the output destination of the mobile terminal that sends the request to share the setting information. In this regard, according to this embodiment, the case is described where the mobile terminal that sends the request to share the setting information includes the setting information that is applicable to the image forming apparatus that is the output destination of the mobile terminal that sends the request to share the setting information.

Figure 17:
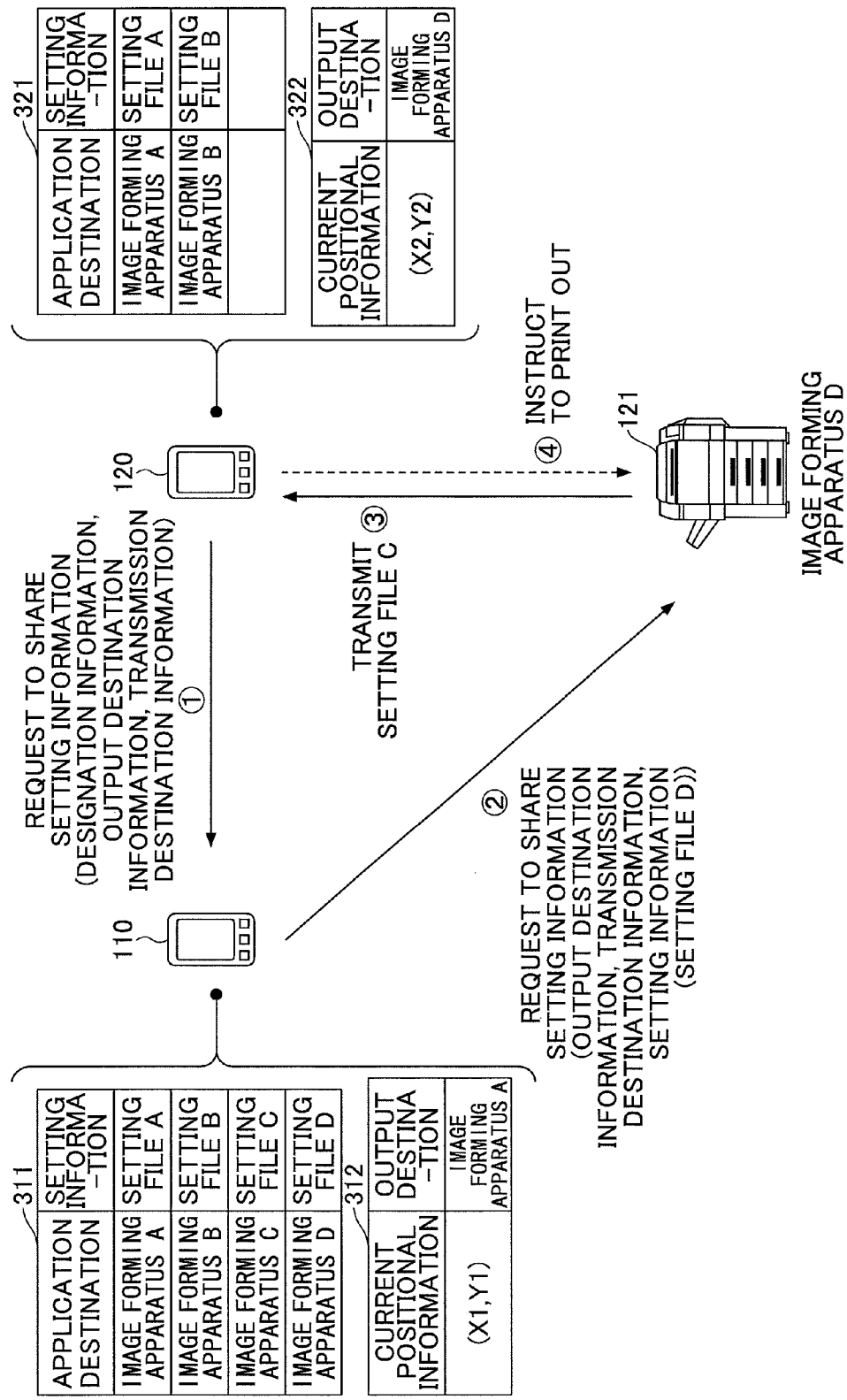
FIG. 17 schematically illustrates another procedure of the sharing process of the setting information and transmission paths of the information in the image forming system.

Procedure of Sharing Process of Setting Information and Transmission Paths of Various Information in Image Forming System FIG. 17 schematically illustrates a procedure of the sharing process of the setting information and the transmission paths of various information in an image forming system 1700. In the following, differences from the configuration in FIG. 3 are mainly described.

As illustrated in FIG. 17, the mobile terminal 110 includes the setting information ("setting file D") that is applicable to the image forming apparatus 121 ("image forming apparatus D") in the setting information data 311. Here, it is assumed that a user of the mobile terminal 120 designates the "image forming apparatus D" as the designation information when sending the request to share the setting information.

In this case, the mobile terminal 110 selects the "setting file D" as the setting information to be shared. Further, the mobile terminal 110 identifies the image forming apparatus 121 ("image forming apparatus D") corresponding to the selected setting information "setting file D" as the transmission destination to which the instruction to share the setting information is to be transmitted.

Namely, the mobile terminal 110 transmits the instruction to share the setting information to the image forming apparatus 121 ("image forming apparatus D").

In this case, the output destination information indicates that the output destination corresponds to the image forming apparatus 121 ("image forming apparatus D") that has received the instruction to share the setting information. Therefore, it is not necessary for the image forming apparatus 121 ("image forming apparatus D") to send the request to provide the performance information and receive the performance information from another image forming apparatus to compare the performance information of the other image forming apparatus with the performance information of the image forming apparatus 121 ("image forming apparatus D").

Figure 18:
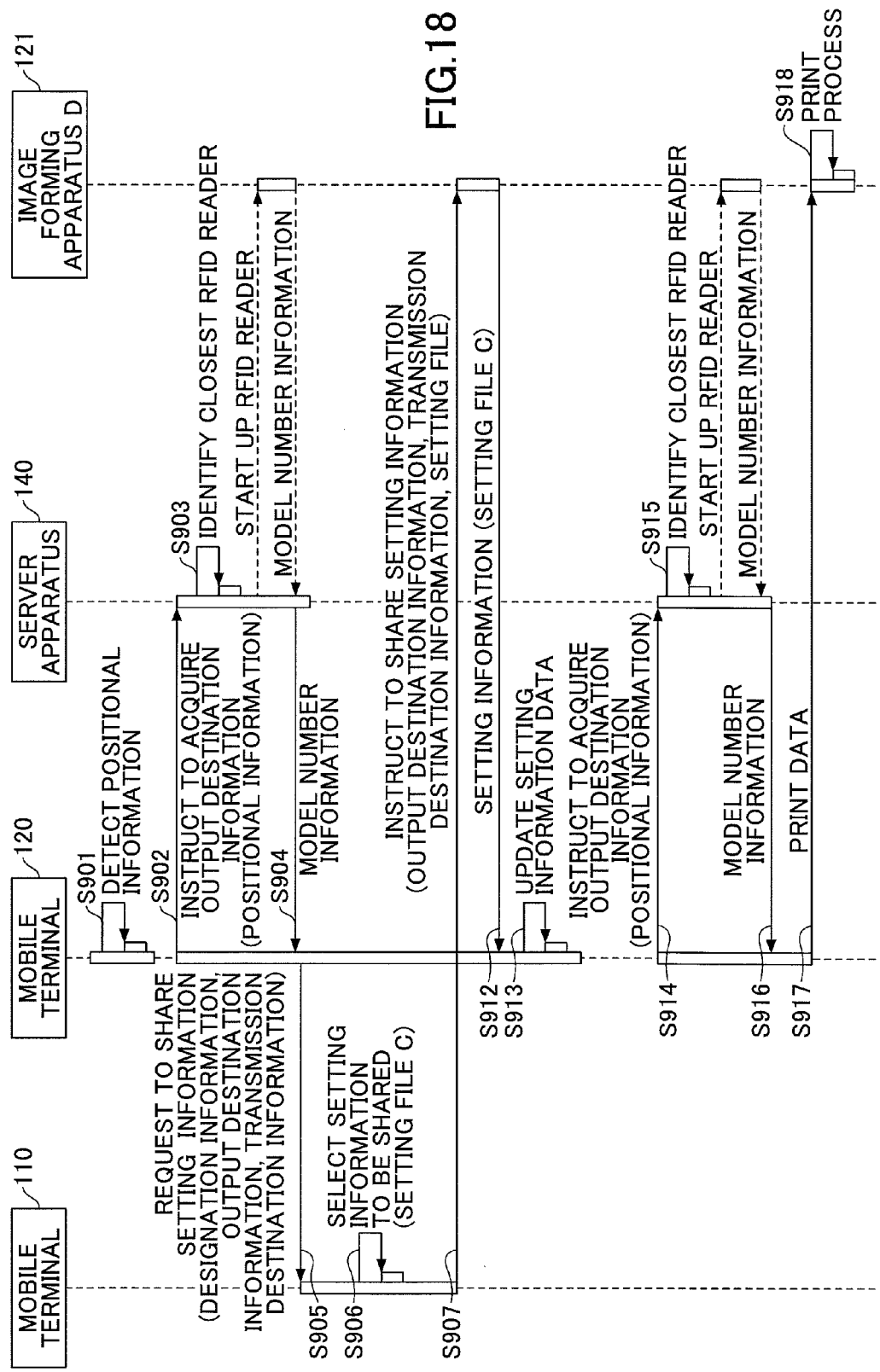
FIG. 18 is still another sequence diagram illustrating a flow of the sharing process of the setting information in the image forming system.

Due to this, the image forming apparatus 121 ("image forming apparatus D") transmits the setting information included in the instruction to share the setting information to the identified mobile terminal 120 based on the transmit destination information. Flow of sharing process of setting information in an image forming system FIG. 18 is a sequence diagram illustrating a flow of the sharing process of the setting information in the image forming system 1700. However, the flow of the sharing process of the setting information in the image forming system 1700 in the sequence diagram of FIG. 18 is similar to that of the image forming system 100 described in the first embodiment with reference to FIG. 9. Therefore, differences from the sequence diagram of FIG. 9 are mainly described.

Specifically, in the sequence diagram of FIG. 18, the differences from that of FIG. 9 are that the processes from step S908 to step S911 are not necessary; the designation destination of the instruction to share the setting information by the mobile terminal 110 is not the image forming apparatus 111 but the image forming apparatus 121 (step S907); and the setting information is transmitted not by the image forming apparatus 111 but by the image forming apparatus 121 (step S912).

As described above, in this embodiment, when the image forming apparatus that has received the instruction to share the setting information determines that the output destination information included in the instruction indicates the image forming apparatus, the image forming apparatus directly transmits the setting information included in the instruction to the mobile terminal identified based on the transmission destination information. By doing this, it become possible to simplify the sharing process of the setting information.

Sixth Embodiment

In the first embodiment, the instruction to share the setting information is transmitted to the image forming apparatus that is associated with the setting information to be shared. However, the present invention is not limited to this configuration.

Figure 19:
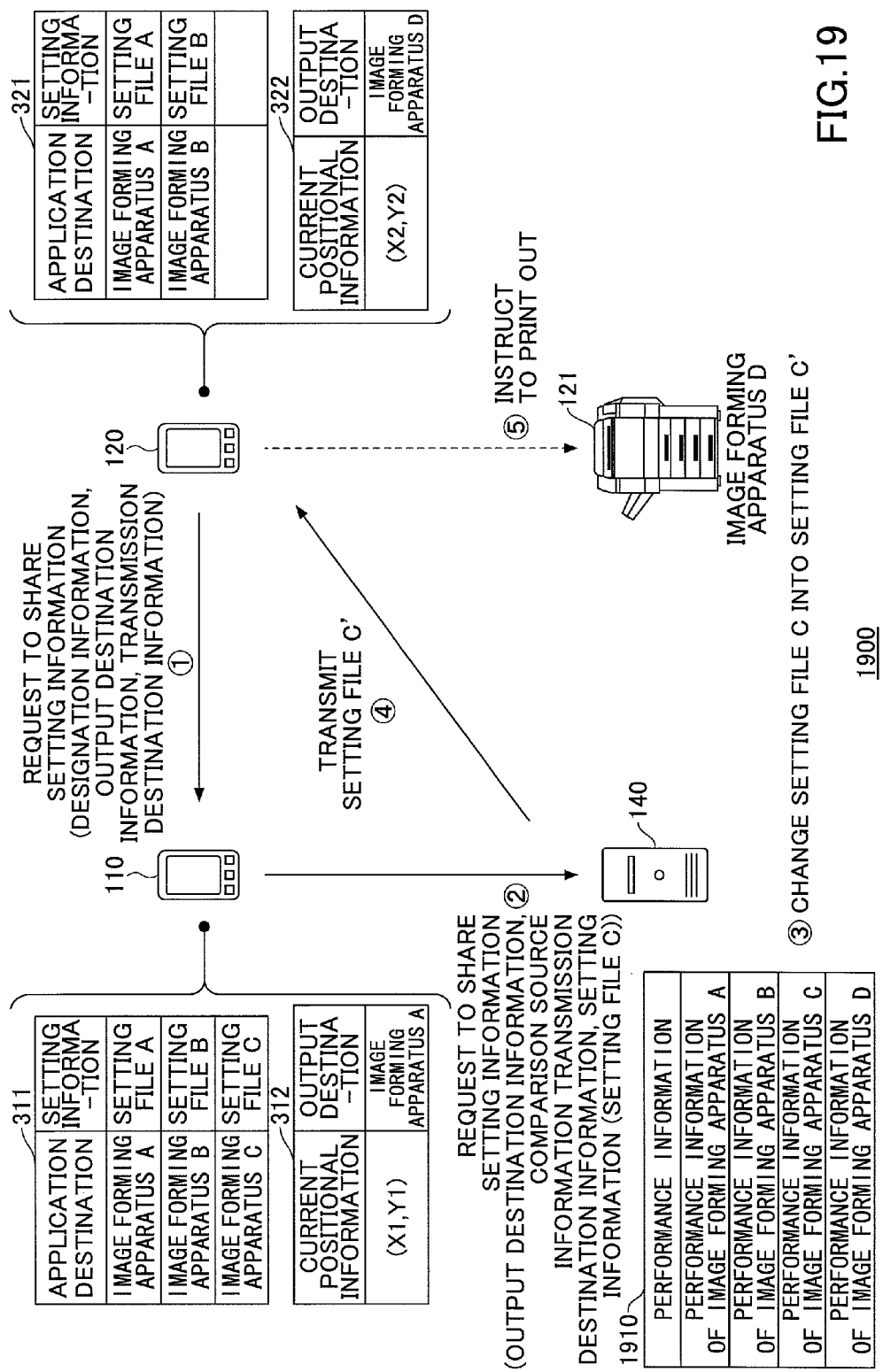
FIG. 19 schematically illustrates still another procedure of the sharing process of the setting information and transmission paths of the information in the image forming system.

For example, when the server apparatus 140 collectively manages the performance information of all the image forming apparatuses in the image forming system, the instruction may be transmitted to the server apparatus 140.
Procedure of Sharing Process of Setting Information and Transmission Paths of Various Information in Image Forming System FIG. 19 schematically illustrates a procedure of the sharing process of the setting information and the transmission paths of various information in an image forming system 1900. In the following, differences from the configuration in FIG. 3 are mainly described.

As illustrated in FIG. 19, in the image forming system 1900 according to this embodiment, the server apparatus 140 includes performance information 1910 of the image forming apparatuses. Therefore, the mobile terminal 110 that received the request to share the setting information transmits the request to share the setting information to the server apparatus 140.

Here, it is assumed that the mobile terminal 110 includes the information that indicates the image forming apparatus in association with the selected setting information ("comparison source information") into the instruction to share the setting information when transmitting the instruction to share the setting information.

The server apparatus 140 that received the instruction to share the setting information identifies the image forming apparatus ("image forming apparatus D") that is identified by the output destination information included in the instruction. Further, the server apparatus 140 identifies the image forming apparatus ("image forming apparatus C") that is identified based on the comparison source information.

Further, the server apparatus 140 compares the performance information of the identified image forming apparatus ("image forming apparatus D") as the comparison target with the performance information of the identified image forming apparatus ("image forming apparatus C") as the comparison source by reading the performance information 1910. As a result of the comparison, when determining that it is necessary to change the setting information, the server apparatus 140 changes the setting information ("setting file C") included in the instruction to share the setting information. On the other hand, when determining that it is not necessary to change the setting information, the server apparatus 140 does not change the setting information ("setting file C").

Figure 20:
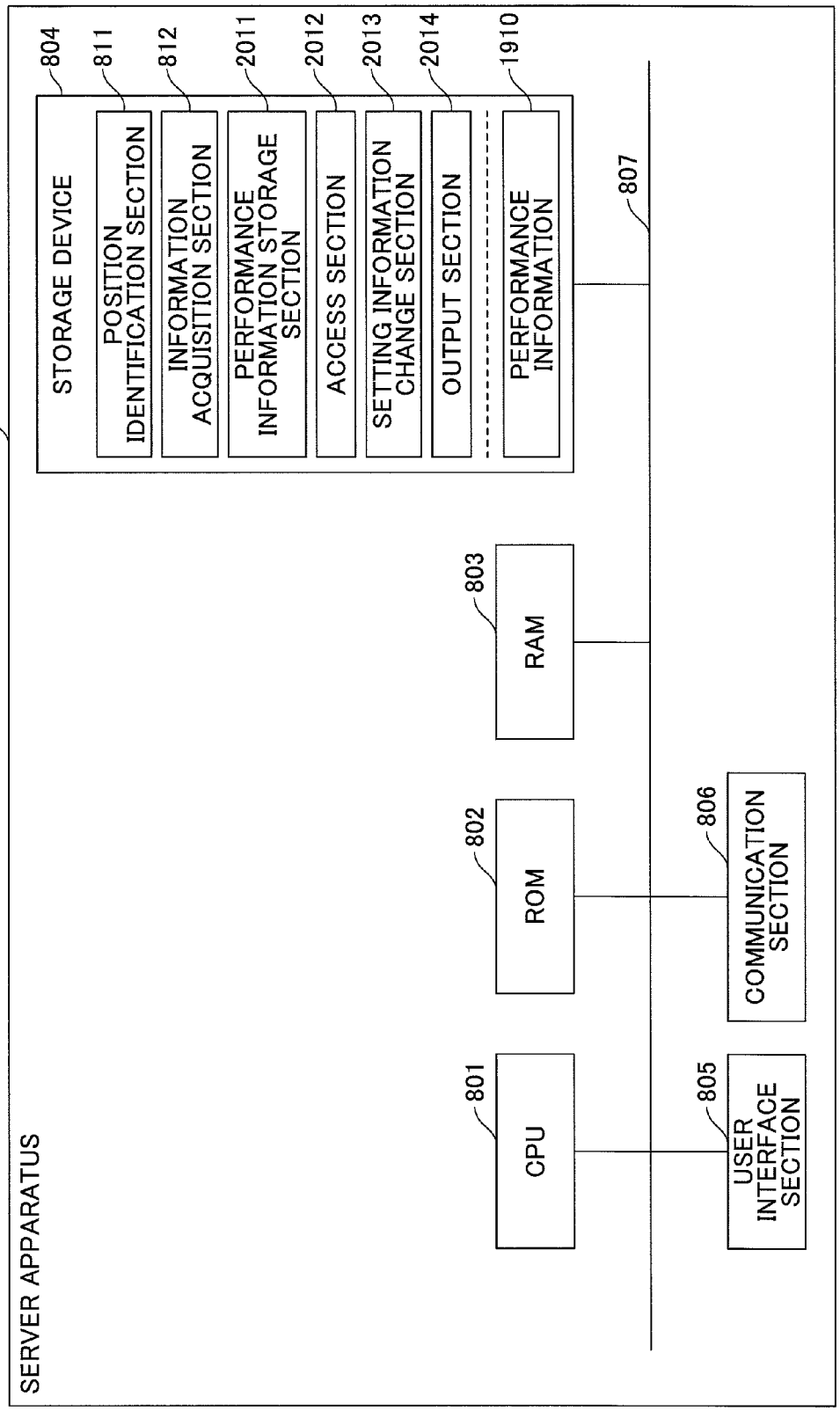
FIG. 20 illustrates another hardware configuration of the server apparatus.

When the change of the setting information is completed, the server apparatus 140 transmits the setting information to the mobile terminal 120 that is identified based on the transmission target information included in the instruction to share the setting information.
Hardware Configuration of the Server Apparatus Next, a hardware configuration of the server apparatus 140 in the image forming system 1900 according to this embodiment is described. FIG. 20 illustrates a hardware configuration of the server apparatus 140 in the image forming system 1900 according to this embodiment.

Here, the hardware configuration of the server apparatus 140 in FIG. 20 is similar to that of the server apparatus 140 described in the first embodiment with reference to FIG. 8. Therefore, differences from the hardware configuration in FIG. 8 are described.

In FIG. 20, a performance information storage section 2011 stores the performance information of all the image forming apparatuses A through D in the image forming system 1900. The performance information 1910 is the performance information of the image forming apparatuses stored by the performance information storage section 2011.

An access section 2012 accesses the mobile terminal based on the transmission destination information included in the instruction to share the setting information.

A setting information change section 2013 determines whether it is necessary to change the setting information by comparing the performance information of the image forming apparatuses. Further, when determining that it is necessary to change the setting information as a result of the comparison, the setting information change section 2013 changes the setting information.

Figure 21:
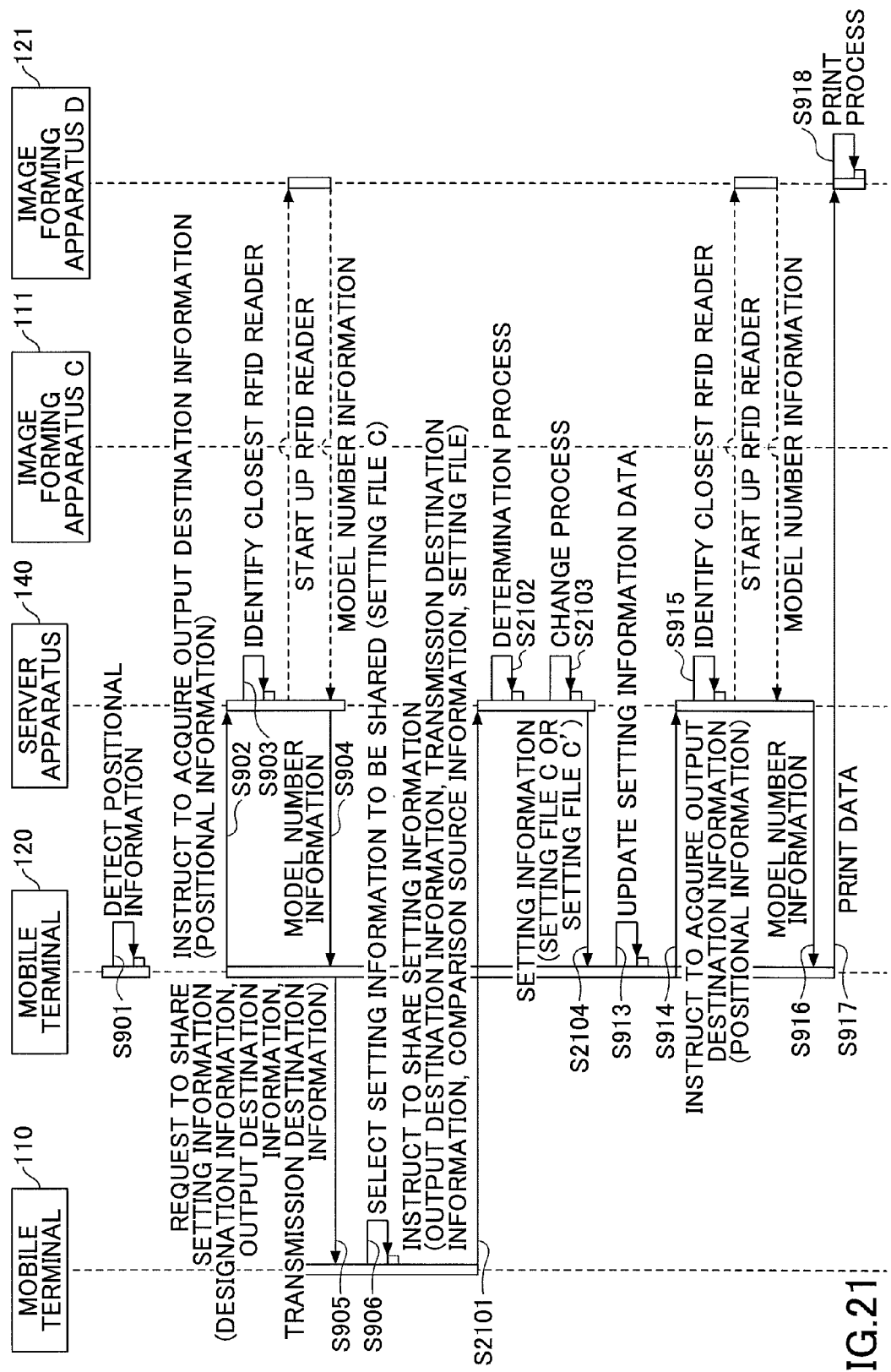
FIG. 21 is still another sequence diagram illustrating a flow of the sharing process of the setting information in the image forming system.

When the change of the setting information is completed, an output section 2014 outputs the changed setting information to the mobile terminal 120 that is accessed by the access section 2012 based on the transmission destination information. Flow of sharing process of setting information in an image forming system FIG. 21 is a sequence diagram illustrating a flow of the sharing process of the setting information in the image forming system 1900. However, the flow of the sharing process of the setting information in the image forming system 1900 in the sequence diagram of FIG. 21 is similar to that of the image forming system 100 described in the first embodiment with reference to FIG. 9. Therefore, differences from the sequence diagram of FIG. 9 are mainly described.

In step S2101 in the sequence diagram of FIG. 21, the mobile terminal 110 transmits the instruction to share the setting information to the server apparatus 140. Here, the instruction to share the setting information includes the output destination information, the transmission destination information, the comparison source information, and the setting information.

The server apparatus 140 that received the instruction to share the setting information compares the performance information of the image forming apparatus identified by the output destination information included in the instruction with the performance information of the image forming apparatus identified based on the comparison source information included in the instruction (step S2102).

As a result of the comparison, when determining that it is necessary to change the setting information, the server apparatus 140 changes the setting information included in the instruction to share the setting information (step S2103). On the other hand, when determining that it is not necessary to change the setting information, the server apparatus 140 does not change the setting information.

When the change of the setting information is completed, the server apparatus 140 transmits the setting information to the mobile terminal identified based on the transmission destination information included in the instruction to share the setting information.

As described above, by collectively managing the performance information, it becomes no longer necessary to communicate the request to provide the performance information, etc., between the image forming apparatuses.

Seventh Embodiment

In the first through the sixth embodiments, the server apparatus 140 identifies the RFID reader installed near the mobile terminal based on the positional information of the mobile terminal. However, the present invention is not limited to this configuration. Namely, any other method of identifying the image forming apparatus closest to the mobile terminal may be used.

Further, in the first through the sixth embodiments, a case is describe where the print function among the functions of the image forming apparatus 121 is executed. However, the present invention is not limited to this configuration. The sharing process of the setting information may be performed in order to execute another function (job) of the image forming apparatus 121.

Further, in the sixth embodiment, the request to share the setting information and the instruction to share the setting information include the transmission destination information. However, the present invention is not limited to this configuration. Similar to the third embodiment, the request to share the setting information and the instruction to share the setting information may not include the transmission destination information.

Further, in the sixth embodiment, the server apparatus 140 directly transmits the setting information to the mobile terminal 120. However, the present invention is not limited to this configuration. Similar to the fourth embodiment, the server apparatus 140 may transmits the setting information to the mobile terminal 120 via the mobile terminal 110.

Eighth Embodiment

The sharing process of the setting information in an image forming system according to an eighth embodiment is described.

Figure 22:
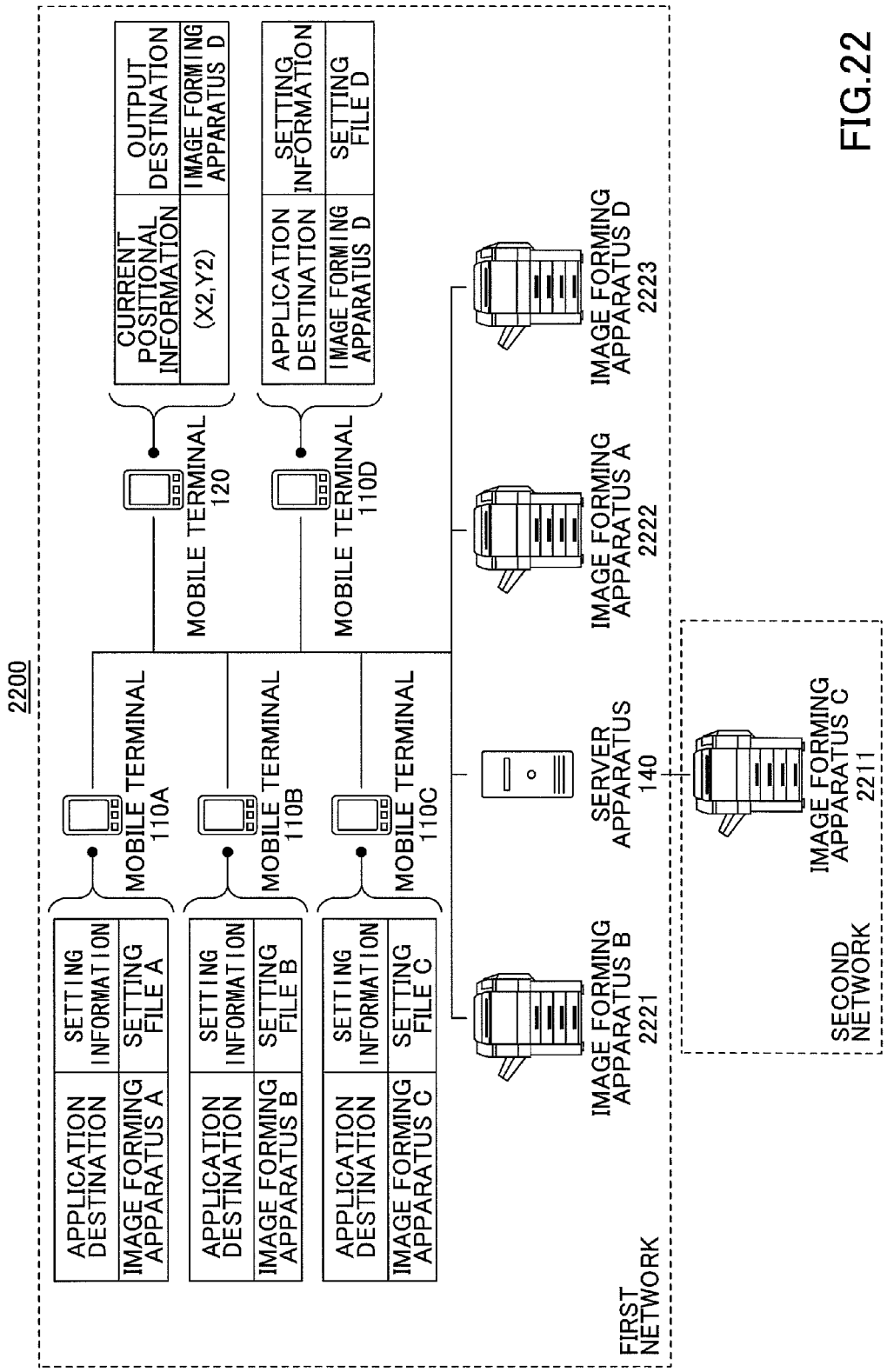
FIG. 22 illustrates the sharing process of the setting information in the image forming system.

FIG. 22 illustrates an image forming system 2200 according to the eighth embodiment of the present invention. As illustrated in FIG. 22, the image forming system 2200 includes a first network and a second network. In the first network, the mobile terminal 120, mobile terminals 110A through 110D, the server apparatus 140, an image forming apparatus 2221 ("image forming apparatus B"), an image forming apparatus 2222 ("image forming apparatus A"), and an image forming apparatus 121 ("image forming apparatus D") are connected to each other. In the second network, there is an image forming apparatus 2211 ("image forming apparatus C") that is connected to the server apparatus 140 in the first network. Here, it is assumed that no setting information is stored in the mobile terminal 120 but the mobile terminals 110A through 110D store the setting files A through D for the image forming apparatuses A through D, respectively.

With reference to FIG. 23, similar to the above embodiments, the sharing process of the setting information is described when the mobile terminal 120 causes the closest image forming apparatus D to perform printing in the image forming system 2200. FIG. 23 is a sequence diagram illustrating a flow of the sharing process of the setting information in the image forming system 2200.

Figure 24C:
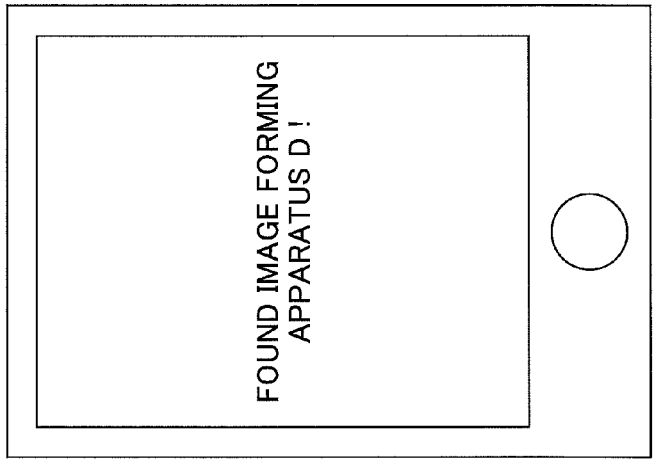
Figure 24B:
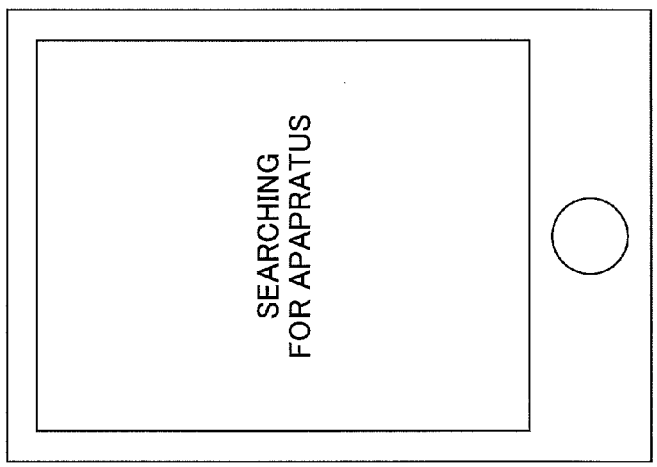
Figure 24A:
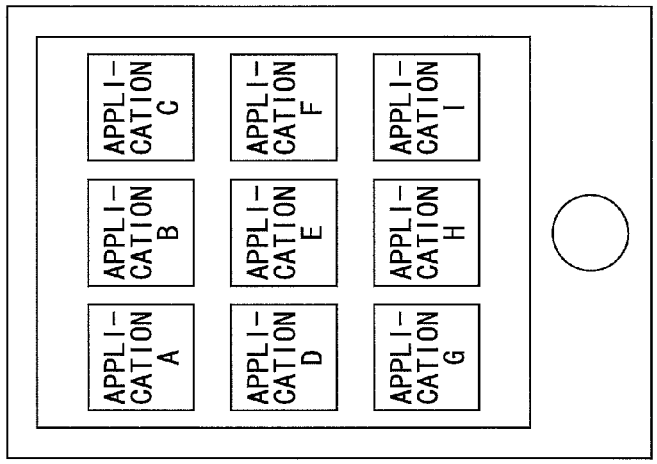

In step S2301, a user selects an application ("Application A" in FIG. 24A) to cause the image forming apparatus D to print out among the applications for the mobile terminal 120. In step S2302, the mobile terminal 120 starts up the "Application A". In step S2303, the mobile terminal 120 detects the positional information of the mobile terminal 120. In step S2304, the mobile terminal 120 transmits the detected positional information to the server apparatus 140. In this case, the mobile terminal 120 may display such a screen of FIG. 248.

In step S2305, the server apparatus 140 searches for the image forming apparatus near the mobile terminal 120 based on the positional information transmitted from the mobile terminal 120. In step S2306, the server apparatus 140 sends a request to acquire the model number information to the image forming apparatus that is searched for based on the transmitted positional information (in this embodiment, "image forming apparatus D"). In step S2307, the server apparatus 140 receives the model number information transmitted from the image forming apparatus D. Here, the model number information is an example of the information to identify the image forming apparatus. In this regard, it is not always necessary to send the model number information. For example, any other information items such as, for example, type information, identification information, manufacturing number, network address, etc., may alternatively be used. In step S2308, the server apparatus 140 transmits the model number information, which is receive from the image forming apparatus D, to the mobile terminal 120. In this case, in order for the server apparatus 140 to identify the mobile terminal 120, it is assumed that, in step S2304, the mobile terminal 120 transmits the identification information (e.g., address on the network or the like) of the mobile terminal 120 as well as the positional information of the mobile terminal 120 to the server apparatus 140. Further, when the mobile terminal 120 receives the model number information, the mobile terminal 120 may display such a display screen of FIG. 24C.

In step S2309, the mobile terminal 120 sends a request to acquire the setting files (setting information) to the mobile terminals 110A through 110D that are accessible in the first network. In step S2310, the mobile terminal 120 receives the setting files (setting information) from the mobile terminals 110A through 110D. Here, the processes in steps S2309 and S2310 may be performed after the mobile terminal 120 receives the searched-for model number information or when the mobile terminal 120 starts up the "Application A" in step S2302. Otherwise, the processes in steps S2309 and S2310 may be performed after the mobile terminal 120 transmits the positional information in step S2304 and while the server apparatus 140 searches for the image forming apparatus near the mobile terminal 120.

In step S2311, the mobile terminal 120 displays the setting files, which are received from the mobile terminals 110A through 110D in step S2310, in such a display screen of FIG. 24E. Here, before the setting files are displayed in such a display screen of FIG. 24E, a display screen to select the setting method in such a display screen of FIG. 24D may be displayed, so that such a display screen of FIG. 24E is displayed after the "search for setting" button in FIG. 24D is selected.

In step S2312, the mobile terminal 120 receives the selection of the setting file by the user. Then, in step S2313, the mobile terminal 120 sends the request to share the setting file (setting information) to the mobile terminal that stores the selected setting file. In the embodiment, it is assumed that the mobile terminal 120 receives the selection of the setting file A stored in the mobile terminal 110A. Therefore, in step S2312, the mobile terminal 120 displays the display screen of FIG. 24F, so that when the user taps the OK button, the request to share the setting file (setting information) is transmitted to the mobile terminal 110A.

In step S2314, the mobile terminal 110A receives the request for the sharing, and determines the transmission destination of the setting file. Here, with reference to FIG. 25, the method of determining the transmission destination of the setting file is described. FIG. 25 is a flowchart illustrating the process of determining the transmission destination of the setting file.

In step S2501, the mobile terminal 110A determines whether the image forming apparatus that is identified based on the output destination information transmitted from the mobile terminal 120 is the same as the image forming apparatus that is the application destination of the setting file A to be shared. When it is determined that it is the same image forming apparatus, the process goes to step S2502.

In step S2502, the mobile terminal 110A determines whether the mobile terminal 110A and the image forming apparatus that is the output destination (i.e., the image forming apparatus that is the application destination of the setting file) are included in the same network. When it is determined that the mobile terminal 110A and the image forming apparatus of the output destination are included in the same network in step S2502, the process goes to step S2503. In step S2503, the mobile terminal 110A transmits the setting file to the image forming apparatus of the output destination (i.e., the image forming apparatus of the application destination of the setting file). On the other hand, when it is determined that the mobile terminal 110A and the image forming apparatus of the output destination are not included in the same network in step S2502, the process goes to step S2504. In step S2504, the mobile terminal 110A transmits the setting file to the server apparatus 140, so that the server apparatus 140 transmits the setting file to the image forming apparatus of the output destination or the mobile terminal 120.

On the other hand, when it is determined that the image forming apparatus that is identified based on the output destination information transmitted from the mobile terminal 120 is not the same as the image forming apparatus that is the application destination of the setting file A to be shared, the process goes step S2505. In step S2505, the mobile terminal 110A determines whether the mobile terminal 110A and the image forming apparatus that is the application destination of the setting file A are included in the same network. When it is determined that the mobile terminal 110A and the image forming apparatus are not included in the same network in step S2505, the process goes to step S2506. In step S2506, the mobile terminal 110A transmits the setting file to the server apparatus 140, so that the server apparatus 140 transmits the setting file to the image forming apparatus of the output destination or the mobile terminal 120.

On the other hand, when it is determined that the mobile terminal 110A and the image forming apparatus are included in the same network in step S2505, the process goes to step S2507. In step S2507, the mobile terminal 110A further determines whether the image forming apparatus of the application destination of the setting file A has an ability (function) of changing the setting information. In this case, the mobile terminal 110A may determine whether the image forming apparatus has the ability of changing the setting information by, for example, inquiring of the image forming apparatus of the application destination whether the image forming apparatus can change the setting information and receiving the inquiry result.

In step S2507, when it is determined that the image forming apparatus has the ability (function) of changing the setting information, the process goes to step S2508. In step S2508, the mobile terminal 110A transmits the setting file A to the image forming apparatus of the application destination. On the other hand, when it is determined that the image forming apparatus does not have the ability (function) of changing the setting information, the process goes to step S2509. In step S2509, the mobile terminal 110A transmits the setting file A to the server apparatus 140.

Referring back to FIG. 23, the sharing process is described. In this case, the image forming apparatus of the application destination of the setting file A of the mobile terminal 110A is the image forming apparatus A. Here, whether the image forming apparatuses can change the setting information is determined based on the table of FIG. 26, when the process of determining the transmission destination in FIG. 25 is performed, the setting file A is determined to be transmitted to the image forming apparatus A of the application destination. After that, the sharing process is performed in the same manner as the processes in steps S907 through S918 of FIG. 9. Therefore, detailed description thereof is herein omitted. Further, the image forming apparatus C in FIG. 9 corresponds to the image forming apparatus A in this embodiment.

Next, an example is described where the setting file is determined to be transmitted to another transmission destination in the transmission destination determination process of FIG. 25. When the setting file B of the mobile terminal 110B is selected in FIG. 23, the mobile terminal 110B determines that the setting file B is to be transmitted to the server apparatus 140 in step S2509 of FIG. 25. After that, the processes in steps S2101 through S918 of FIG. 21 are performed. Further, the image forming apparatus C of FIG. 21 corresponds to the image forming apparatus B in this embodiment.

Further, when the setting file C of the mobile terminal 110C is selected in FIG. 23, the mobile terminal 110C determines that the setting file C is to be transmitted to the server apparatus 140 in step S2506 of FIG. 25. After that, the processes in steps S2101 through S918 of FIG. 21 are performed. Further, the image forming apparatus C of FIG. 21 corresponds to the image forming apparatus C in this embodiment.

Further, when the setting file D of the mobile terminal 110D is selected in FIG. 23, the mobile terminal 110D determines that the setting file D is to be transmitted to the image forming apparatus D in step S2503 of FIG. 25. After that, the processes in steps S907 through S918 of FIG. 18 are performed.

Figure 27:
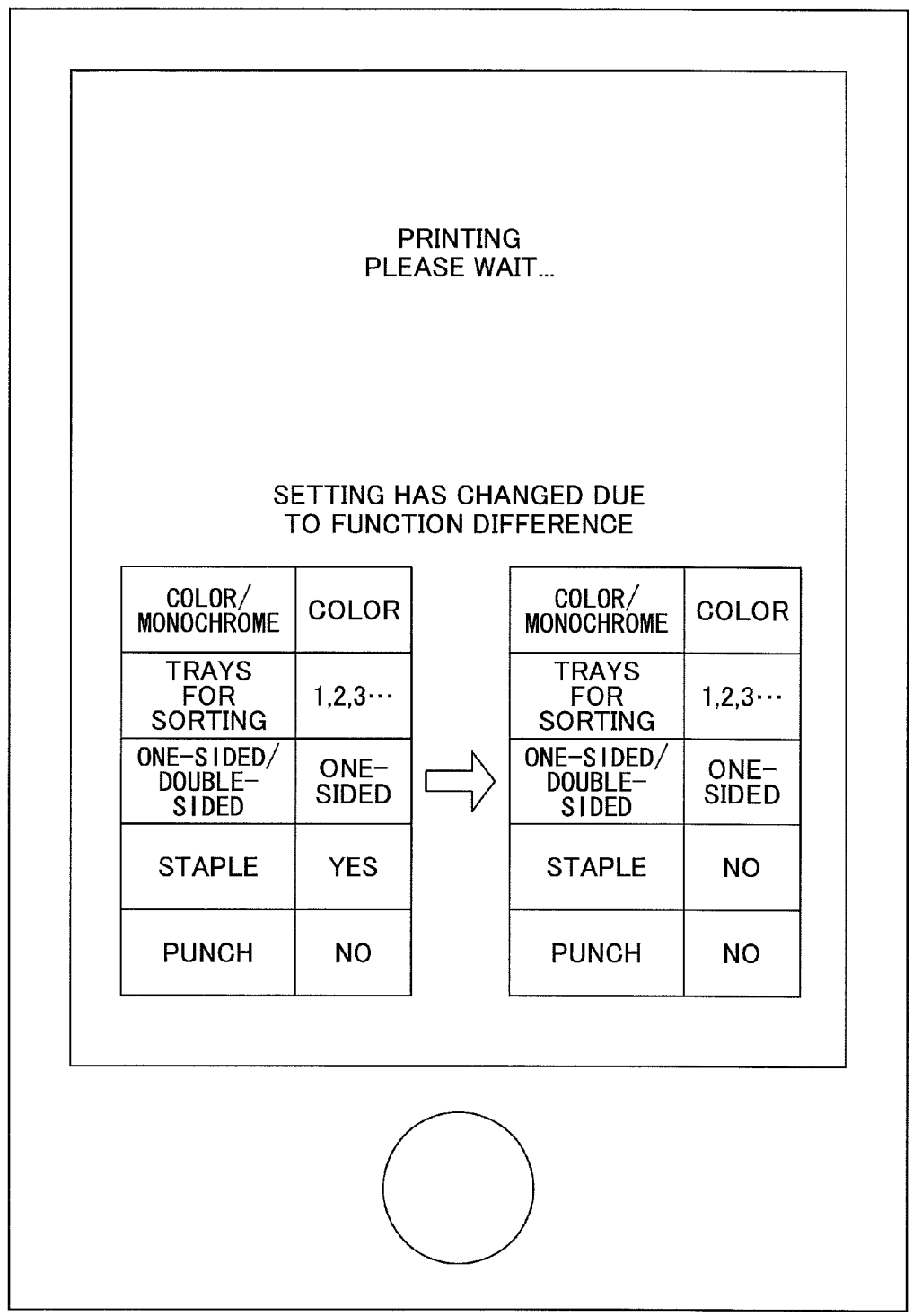
FIG. 27 illustrates another display screen of the mobile terminal.

Further, when print data are transmitted to the image forming apparatus having the ability of changing the setting function, a message indicating that the setting information is changed and the setting information before and after the changing are displayed (see FIG. 27).

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming system comprising:
first and second mobile terminals; and
first and second image forming apparatuses,
wherein the first mobile terminal includes
a storing unit configured to store setting information to be used to cause the first image forming apparatus to perform a process,
a receiving unit configured to receive identification information identifying the second image forming apparatus and a request to acquire the setting information stored in the storing unit from the second mobile terminal, and
a first transmission unit configured to transmit the identification information identifying the second image forming apparatus received by the receiving unit and the setting information stored in the storing unit to the first image forming apparatus,
wherein the first image forming apparatus includes
an acquisition unit configured to acquire ability information indicating ability of the second image forming apparatus identified based on the identification information transmitted from the first mobile terminal,
a first determination unit configured to determine whether the setting information, transmitted from the first mobile terminal, is to be changed based on a comparison between the ability information indicating the ability of the second image forming apparatus acquired by the acquisition unit and ability of the first image forming apparatus,
a change unit configured to, when the first determination unit determines that the setting information is to be changed, change the setting information based on the ability information indicating the ability of the second image forming apparatus, and
a second transmission unit configured to transmit the setting information that has been changed by the change unit to the second mobile terminal.

2. The image forming system according to claim 1,
wherein the first image forming apparatus further includes
a checking unit configured to determine whether the first mobile terminal permits the change of the setting information when the first determination unit determines that the setting information is to be changed, and
wherein the change unit is configured to change the setting information when the checking unit determines that the first mobile terminal permits the change of the setting information.

3. The image forming system according to claim 1, further comprising:
a server apparatus configured to receive positional information of the second mobile terminal and identify the second image forming apparatus based on the received positional information.

4. The image forming system according to claim 3,
wherein the first mobile terminal further includes
a second determination unit configured to determine whether the first image forming apparatus is connected to a network where the first mobile terminal is connected,
wherein the first transmission unit is configured to, when the second determination unit determines that first image forming apparatus is not connected to the network, transmit the identification information identifying the second image forming apparatus received by the receiving unit and the setting information stored in the storing unit to the server apparatus, and
wherein the server apparatus includes the acquisition unit, the change unit, and the second transmission unit.

5. The image forming system according to claim 1,
wherein the second mobile terminal is configured to transmit an instruction, by using the setting information transmitted by the second transmission unit, to the second image forming apparatus to perform printing.

6. An image forming system comprising:
first and second mobile terminals; and
first, second, and third image forming apparatuses,
wherein the first mobile terminal includes
a first transmission unit configured to transmit identification information identifying the first image forming apparatus and a request to acquire setting information, stored in the second mobile terminal, to be used to cause the second image forming apparatus to perform a process to the second mobile terminal,
wherein the second mobile terminal includes
a storage unit configured to store identification information identifying the second image forming apparatus and the setting information to be used to cause the second image forming apparatus to perform the process,
a receiving unit configured to receive the identification information identifying the first image forming apparatus and the request from the first mobile terminal,
a first determination unit configured to determine whether the setting information requested to be acquired by the request received by the receiving unit is stored in association with the first image forming apparatus in the storage unit, and
a second transmission unit configured to, when the first determination unit determines that the setting information is not stored in association with the first image forming apparatus, transmit the identification information identifying the first image forming apparatus received by the receiving unit and the setting information requested to be acquired by the request and stored in the storage unit to the third image forming apparatus that stores the setting information in association with identification information, and
wherein the third image forming apparatus includes
an acquisition unit configured to acquire ability information from the first image forming apparatus, the ability information indicating ability of the first image forming apparatus identified by the identification information transmitted from the second mobile terminal,
a second determination unit configured to determine whether the setting information transmitted from the second mobile terminal is to be changed based on a comparison between the ability information indicating the ability of the first image forming apparatus received by the acquisition unit and ability of the third image forming apparatus, a change unit configured to, when the second determination unit determines that the setting information is to be changed, change the setting information based on the ability information indicating the ability of the first image forming apparatus, and a third transmission unit configured to transmit the setting information having been changed by the change unit to the first mobile terminal.

* * * * *